(12) United States Patent
Shio et al.

(10) Patent No.: US 6,553,042 B2
(45) Date of Patent: Apr. 22, 2003

(54) LASER APPARATUS FOR GENERATING VACUUM ULTRAVIOLET NARROW-BAND LASER BEAMS

(75) Inventors: Koji Shio, Hiratsuka (JP); Toru Suzuki, Hiratsuka (JP); Osamu Wakabayashi, Hiratsuka (JP)

(73) Assignee: Komatsu Ltd., Tokyo (JP)

( * ) Notice: Subject to any disclaimer, the term of this patent is extended or adjusted under 35 U.S.C. 154(b) by 94 days.

(21) Appl. No.: 09/727,510

(22) Filed: Dec. 4, 2000

(65) Prior Publication Data

US 2001/0053162 A1 Dec. 20, 2001

(30) Foreign Application Priority Data

Dec. 7, 1999 (JP) .......................................... 11-347635

(51) Int. Cl.[7] .............................. H01S 3/10; H01S 3/13; H01S 3/22
(52) U.S. Cl. ......................... 372/9; 372/23; 372/24.02; 372/55
(58) Field of Search ............................. 372/20, 32, 57, 372/102

(56) References Cited

U.S. PATENT DOCUMENTS 5,373,515 A * 12/1994 Wakabayashi et al. ........ 372/20

FOREIGN PATENT DOCUMENTS

| JP | 2631569 | 10/1991 | |
|---|---|---|---|
| JP | 5095154 | 4/1993 | |
| JP | 05095154 | * 4/1993 | ........... H01S/3/106 |

* cited by examiner

Primary Examiner—Paul Ip
Assistant Examiner—Armando Rodriguez

(57) ABSTRACT

In a laser apparatus, a central wavelength of vacuum ultraviolet laser beams whose bandwidth is narrowed can be maintained at a target wavelength in high precision. This laser apparatus includes a laser oscillator for generating a vacuum ultraviolet laser beam whose bandwidth is narrowed and a reference beam having a spectral distribution of a vacuum ultraviolet band to output both the vacuum ultraviolet laser beam and the reference beam; a wavelength meter for measuring a central wavelength of the vacuum ultraviolet laser beam whose bandwidth is narrowed by using at least one emission light contained in the reference beam as a reference; and a controller for controlling the laser oscillator based upon the central wavelength of the vacuum ultraviolet laser beam whose bandwidth is narrowed, which is measured by the wavelength meter, so as to thereby adjust the central wavelength of the vacuum ultraviolet laser beam whose bandwidth is narrowed to a target wavelength. As a result, this laser apparatus can output the vacuum ultraviolet laser beams whose bandwidth is narrowed and whose central wavelength is maintained at the target wavelength in high precision.

18 Claims, 16 Drawing Sheets

LASER APPARATUS FOR GENERATING VACUUM ULTRAVIOLET NARROW-BAND LASER BEAMS

BACKGROUND OF THE INVENTION

1. Field of the Invention

The present invention relates to a laser apparatus capable of generating vacuum ultraviolet narrow-band laser beams, while maintaining a target wavelength in high precision.

2. Description of a Related Art

Recently, there are drastic changes in integration degrees of semiconductor devices, so that higher improvements are required as to resolution of exposure system used in semiconductor industries. To suppress chromatic aberration occurred in lenses employed in exposure system, semiconductor device exposing operations should be carried out by using narrow spectral light, or beams. To this end, such laser apparatus capable of generating laser beams whose bandwidths are narrowed is expected as light sources of such exposure system. These laser apparatus is required to output laser beams whose bandwidths are narrowed while maintaining constant wavelengths thereof.

Japanese Patent Publication JP-B2-2631569 (relevant to JP-A-3-238329) discloses the following laser apparatus. That is, the wavelength component in the vicinity of the target wavelength of the excimer laser whose bandwidth is narrowed is selected from the reference beam whose spectral distribution is known, and while the selected wavelength component is used as the reference, the wavelength of the excimer laser whose bandwidth is narrowed is kept at the target wavelength during the laser beam output operation.

In future, it is highly expected that integration degrees of semiconductor devices are reached to 4 gigabytes. In this case, as laser beams used in exposure operations, utilization of molecular fluorine laser beams whose bandwidths are made narrow would be highly expected. However, the above-mentioned Japanese Patent Publication JP-B2-2631569 neither discloses, nor teaches such molecular fluorine laser beams whose bandwidth is narrowed.

On the other hand, Japanese Patent Publication JP-A-5-95154 discloses such a laser apparatus that the spectrum of the atomic fluorine laser beam whose bandwidth is not narrowed is employed as the reference, and the molecular fluorine laser beam whose bandwidth is narrowed is output while the wavelength of this molecular fluorine laser beam is maintained at the target wavelength.

However, a molecular fluorine laser beam, or laser light constitutes one sort of vacuum ultraviolet laser beams, the spectrum of which belongs to the vacuum ultraviolet range. On the other hand, an atomic fluorine laser beam constitutes one sort of visible laser beams, the spectrum of which belongs to the visible range. As a result, the target wavelength of the molecular fluorine laser beam whose bandwidth is narrowed is largely deviated from the spectrum of the atomic fluorine laser beam. As a consequence, the laser apparatus disclosed in JP-A-5-95154 can not output the molecular fluorine laser beam whose bandwidth is narrowed, while maintaining the wavelength of the molecular fluorine laser beam at the target wavelength in high precision.

Under such a circumstance, novel laser apparatus is highly expected by which vacuum ultraviolet laser beams whose bandwidths are narrowed, in particular, molecular fluorine laser beams whose bandwidths are narrowed can be output, while maintaining wavelengths of these laser beams at target wavelengths in high precision.

SUMMARY OF THE INVENTION

The present invention has been made to solve the above-explained problems, and therefore, has an object to provide such a laser apparatus capable of outputting vacuum ultraviolet laser beams whose bandwidths are narrowed, while maintaining wavelength of these laser beams at target wavelengths in high precision.

To achieve the above-described object, a laser apparatus according to a first aspect of the present invention comprises: a laser oscillator for generating a vacuum ultraviolet laser beam whose bandwidth is narrowed and a reference beam having a spectral distribution of a vacuum ultraviolet band to output both the vacuum ultraviolet laser beam and the reference beam; a wavelength meter for measuring a central wavelength of the vacuum ultraviolet laser beam whose bandwidth is narrowed by using at least one emission light contained in the reference beam as a reference; and control means for controlling the laser oscillator based upon the central wavelength of the vacuum ultraviolet laser beam whose bandwidth is narrowed, which is measured by the wavelength meter, so as to thereby adjust the central wavelength of the vacuum ultraviolet laser beam whose bandwidth is narrowed to a target wavelength.

Also, a laser apparatus according to a second aspect of the present invention comprises: a laser oscillator for generating a vacuum ultraviolet laser beam whose bandwidth is narrowed to thereby output the vacuum ultraviolet laser beam whose bandwidth is narrowed; a reference light source for generating a reference beam having a spectral distribution of a vacuum ultraviolet band to thereby output the generated reference beam; a wavelength meter for measuring a central wavelength of the vacuum ultraviolet laser beam whose bandwidth is narrowed by using at least one emission light contained in the reference beam as a reference; and control means for controlling the laser oscillator based upon the central wavelength of the vacuum ultraviolet laser beam whose bandwidth is narrowed, which is measured by the wavelength meter, so as to thereby adjust the central wavelength of the vacuum ultraviolet laser beam whose bandwidth is narrowed to a target wavelength.

In the laser apparatus according to the present invention, both the vacuum ultraviolet laser beams whose bandwidth is narrowed and the reference beams are generated from the vacuum ultraviolet light. Then, while at least one emission light contained in the reference beam is employed as a reference, a central wavelength of such vacuum ultraviolet laser beams whose bandwidth is narrowed is measured. In general, since line widths of emission light belonging to the vacuum ultraviolet range are on the order of 1 pm and are sufficiently narrow, a central wavelength of vacuum ultraviolet laser beams whose bandwidth is narrowed can be measured in high precision. According to the present invention, even in such a case that the central wavelength of the vacuum ultraviolet laser beams whose bandwidth is narrowed is drifted and are not made stable, such vacuum ultraviolet laser beams whose bandwidth is narrowed can be output while maintaining the central wavelength of these laser beams at a target wavelength in high precision.

DESCRIPTION OF THE PREFERRED EMBODIMENTS

Referring now to drawings, laser apparatus according various preferred embodiments of the present invention will be described.

Figure 1:
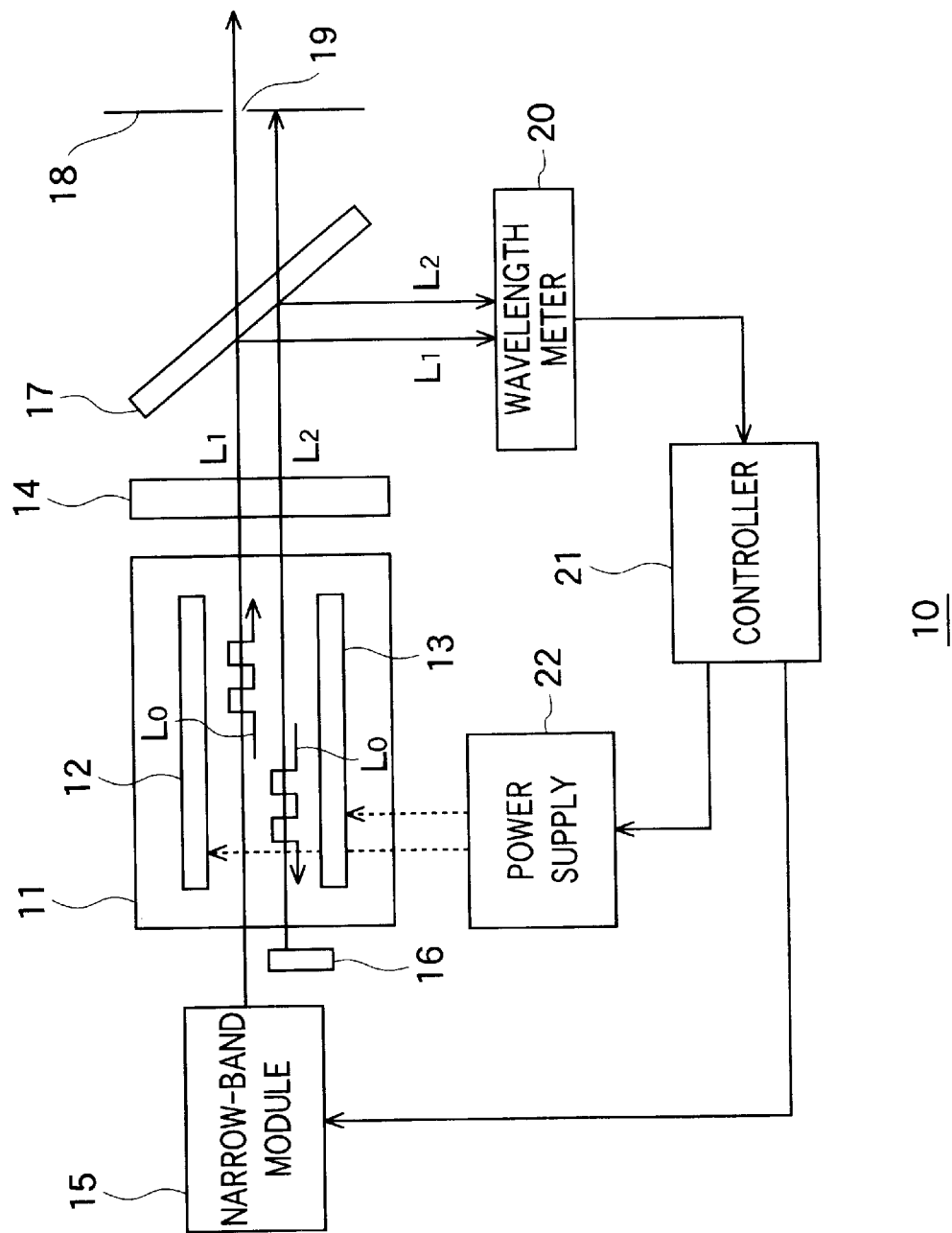
FIG. 1 schematically indicates an overall arrangement of a laser apparatus according to a first embodiment of the present invention.

FIG. 1 illustratively represents an entire arrangement of a laser apparatus according to a first embodiment of the present invention.

The laser apparatus 10 corresponds to such an apparatus capable of producing narrow-band molecular fluorine laser beams having a central wavelength of 157.6299 nm (this wavelength belongs to vacuum ultraviolet region). For instance, the laser apparatus 10 is utilized as a light source of an exposure system. Similarly, laser apparatuses as explained with reference to other preferred embodiments may be used as light sources of exposure system.

The laser apparatus 10 is provided with a laser chamber 11 which is used to generate fluorescent light "$L_0$". This fluorescent light "$L_0$" contains first emission light having a central wavelength of 157.6299 nm, and second emission light having a central wavelength of 157.5233 nm, the light intensity of which is lower than that of the first emission light. Two discharge electrodes 12 and 13 are positioned opposite to each other within the laser chamber 11. A high voltage is applied between the electrode 12 and the electrode 13 by a high voltage (high potential) power supply 22 in order to cause a discharge operation. While a gaseous medium such as molecular fluorine is supplied into the laser chamber 11, a high voltage is applied between the electrode 12 and the electrode 13 so as to cause a discharge operation between these electrodes, so that fluorescent light "$L_0$" may be generated from the gaseous medium.

A partial reflection mirror 14 is arranged on the right side of the laser chamber 11, whereas a narrow-band module 15 is arranged on the left side of the laser chamber 11. This narrow-band module 15 includes, for example, an etalon, a total reflection mirror, and the like. The narrow-band beams of the vacuum ultraviolet laser beams are made by this narrow-band module 15 in such a manner that a portion of the first emission light contained in the fluorescent light "$L_0$" is resonated between the own narrow-band module 15 and the partial reflection mirror 14, and then the resonated emission light is amplified. As explained above, according to the first embodiment, narrow-band molecular fluorine laser beams "$L_1$" having a center wavelength of 157.6299 nm (simply referred to as "laser beams $L_1$" hereinafter) can be produced from a portion of the first emission light, and then is output from the partial reflection mirror 14.

Alternatively, it should be noted that the bandwidth of the first emission light may be made narrow while any other wavelength than the above-described 157.6299 nm is used as the center wavelength to generate narrow-band molecular fluorine laser beams. Furthermore, the bandwidth of the second emission light may be made narrow while the wavelength of 157.5233 nm or any other wavelength is used as the center wavelength to generate such narrow-band molecular fluorine laser beams.

A total reflection mirror 16 is arranged between the laser chamber 11 and the narrow-band module 15. This total reflection mirror 16 resonates a portion of the fluorescent light "$L_0$" between the own total reflection mirror 16 and the partial reflection mirror 14 and then amplifies the resonated fluorescent light "$L_0$". As explained above, the molecular fluorine laser beam whose bandwidth is not narrowed is generated from a portion of the fluorescent light "$L_0$", and then this molecular fluorine laser beam is output as a reference (laser) beam "$L_2$" from the partial reflection mirror 14. As a result, in the first embodiment, both the first emission light and the second emission light are contained in the reference beam "$L_2$".

A beam splitter 17 is arranged on the right side of the partial reflection mirror 14. The beam splitter 17 splits both the laser beams "$L_1$" and the reference beam "$L_2$", which are output from the partial reflection mirror 14, along two directions. A slit plate 18 is arranged on the right side of the beam splitter 17. A slit 19 capable of penetrating therethrough only the laser beam "$L_1$" is formed on the slit plate 18. As a result, the reference beam "$L_2$" which passes through the beam splitter 17 is cut out by the slit plate 18.

A wavelength meter 20 for measuring a central wavelength of the laser beam "$L_1$" is arranged under the beam splitter 17. As the wavelength meter 20, for instance, there are two different types of wavelength meters, namely one type of wavelength meters includes a grating and a line sensor, and also another type of wavelength meters includes an etalon and an area sensor. For example, the wavelength meter 20 measures a central wavelength of the laser beam "$L_1$", while the respective central wavelengths of the first and second emission light contained in the reference beam "$L_2$" are used as a reference. The measurement result of the wavelength meter 20 is entered into a controller 21. The controller 21 controls various apparatus/devices employed in the laser apparatus 10.

It should also be understood that when the central wavelength of the laser beam "$L_1$" is measured, both the first emission light and the second emission light, which are contained in the reference beam "$L_2$", are preferably employed as the reference light. In this case, since an interpolation is made between two measurement values which are obtained while the respective emission light is employed as the reference light, the measuring precision of the central wavelength of the laser light "$L_1$" can be improved. Also, when the central wavelength of the laser light "$L_1$" is measured, both the laser beam "$L_1$" and the reference beam "$L_2$" may be preferably entered into the wavelength meter 20 at the same time. In this case, the characteristics of the wavelength meter 20, which are varied in response to environmental conditions, can be grasped in real time.

The controller 21 controls the high voltage source 22 so as to adjust the voltage applied between the electrode 12 and the electrode 13. Also, the controller 21 calculates a difference value between the central wavelength of the laser beam "$L_1$" measured by this wavelength meter 20 and a target wavelength. Next, the controller 21 controls the narrow-band module 15 based upon this calculated difference value to adjust the central wavelength of the laser light "$L_1$" to the target wavelength.

Figure 2:
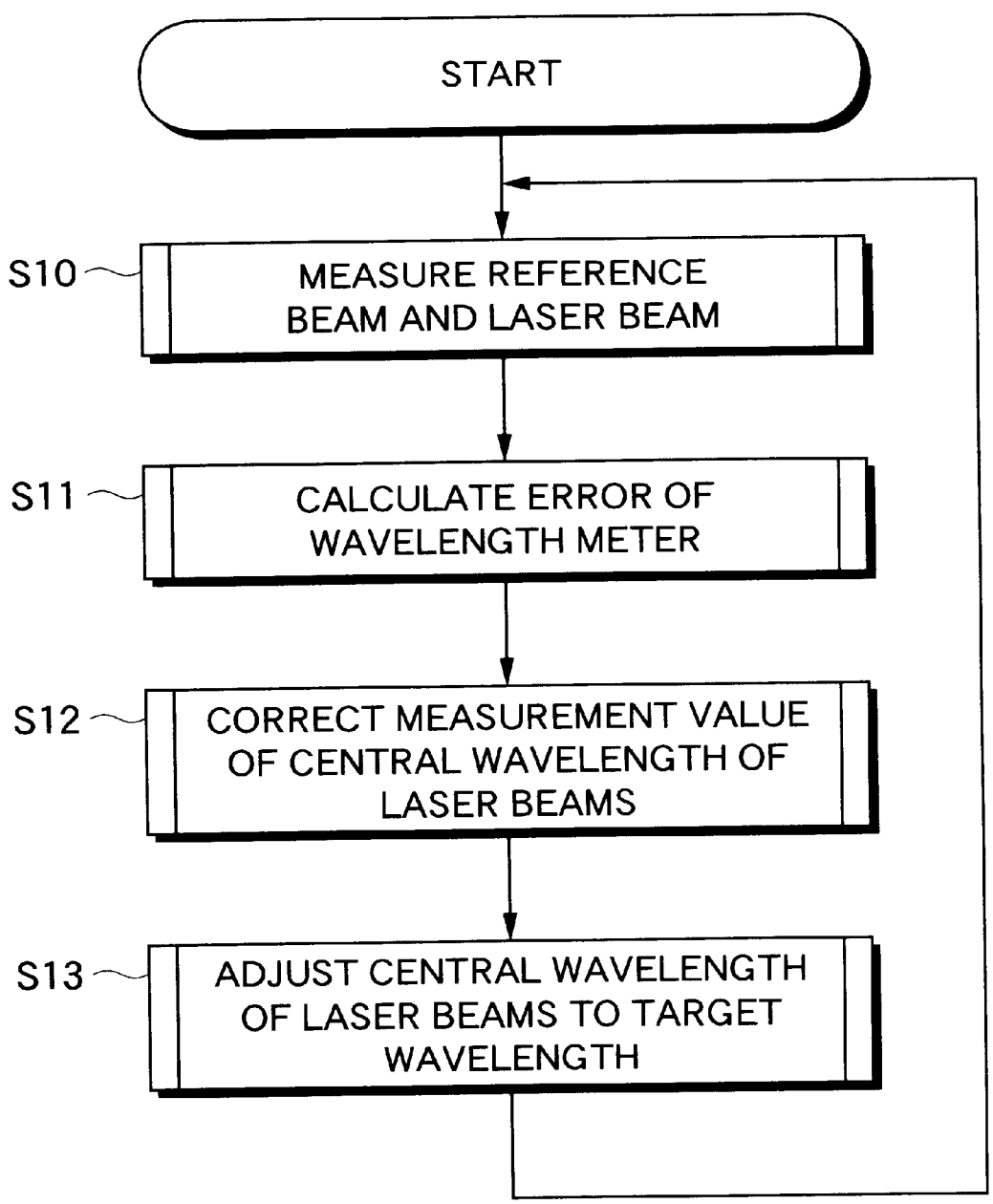
FIG. 2 is a flow chart indicating describing an example of a calibration process of the laser apparatus as shown in FIG. 1.

Referring now to FIG. 2, an example of a calibration process of the laser apparatus 10 according to the first embodiment will be described.

First, at step S10, both a central wavelength of the first emission light and a central wavelength of the second emission light, which are contained in the reference beam "$L_2$", and further a central wavelength of the laser beam "$L_1$" are measured by using the wavelength meter 20.

Next, at step S11, an error caused by the wavelength meter 20 is acquired based upon the central wavelength of the first emission light and the central wavelength of the second emission light measured by the wavelength meter 20.

Furthermore, at step S12, the measurement value of the central wavelength of the laser light "$L_1$" acquired at step S10 is corrected based upon the error acquired at step S11.

Then, at step S13, the controller 21 controls the narrow-band module 15 based on the corrected central wavelength value of the laser beam "$L_1$", acquired at step S12, so that the central wavelength of the laser beam "$L_1$" is adjusted to a target wavelength.

Referring back to FIG. 1, the laser apparatus 10 of the first embodiment is explained.

Vacuum ultraviolet light (beams) such as the fluorescent light "$L_0$", the laser beam "$L_1$", and the reference beam "$L_2$" may be readily absorbed by oxygen. As a result, the optical paths provided in the laser apparatus 10 arranged by the above-explained structures are purged by employing, for example, nitrogen and helium so as to avoid an invasion of oxygen. This purging process is similarly applied to laser apparatus as explained in the below-mentioned embodiments.

As previously described in detail, according to the first embodiment, both the laser beam "$L_1$" and the reference beam "$L_2$" are generated from the florescent light "$L_0$". Then, the central wavelength of the laser beam "$L_1$" is measured, while both the first emission beam and the second emission beam contained in the reference beam "$L_2$" are used as the reference beam. In general, a line width of emission light belonging to a vacuum ultraviolet region is on the order of 1 pm, namely is sufficiently narrow. As a result, the central wavelength of the laser beam "$L_1$" can be measured in high precision. As a consequence, even in such a case that the central wavelength of the laser beam "$L_1$" is drifted and is not made stable, the laser apparatus according to the first embodiment can output a laser beam "$L_1$" while maintaining the central wavelength of the laser beam is at the target wavelength in high precision.

Figure 3:
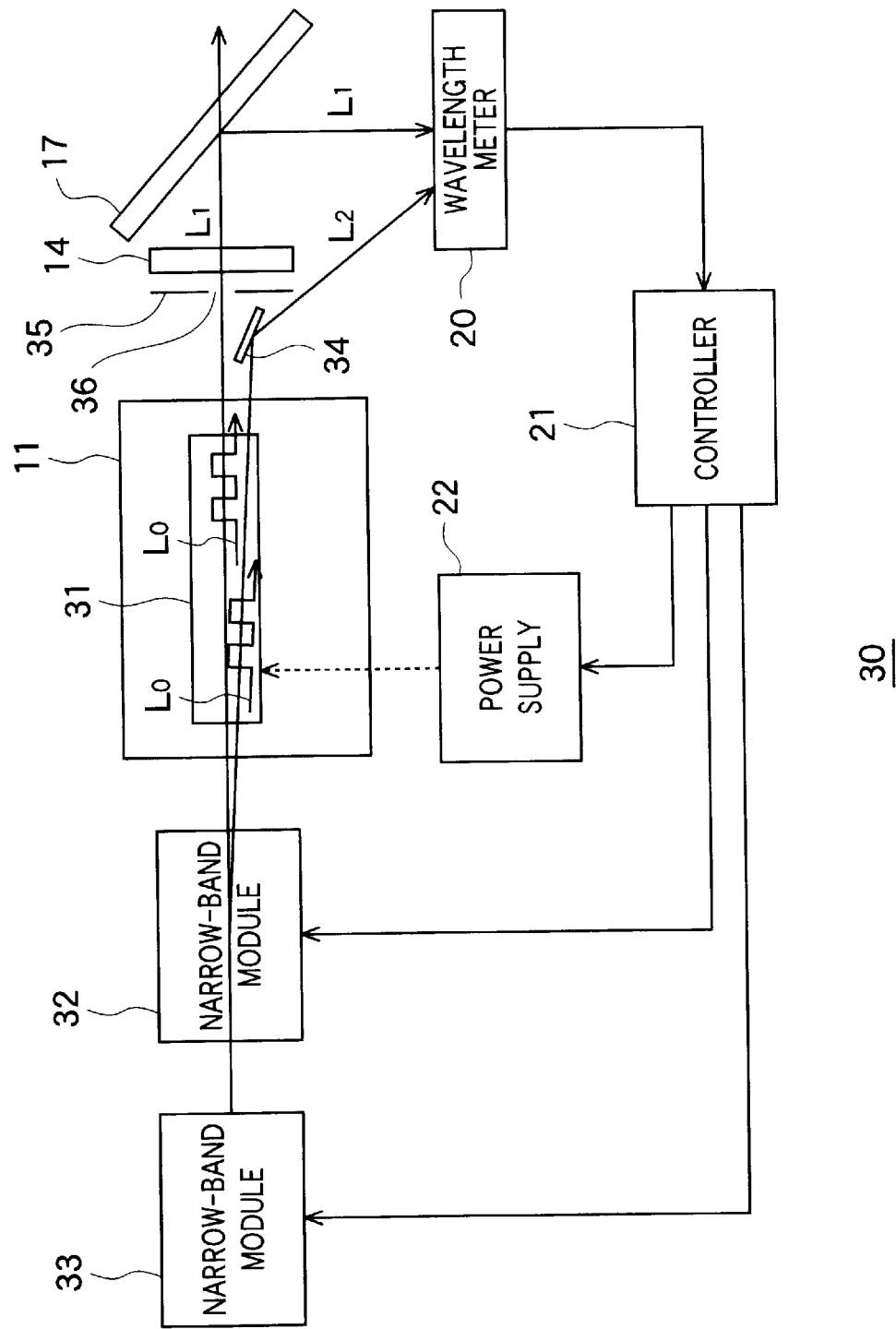
FIG. 3 schematically represents an overall arrangement of a laser apparatus according to a second embodiment of the present invention.

FIG. 3 illustratively shows an overall arrangement of a laser apparatus according to a second embodiment of the present invention. It should be noted that the same reference numerals as shown in FIG. 1 will be employed as those for denoting the same, or similar units in the second embodiment, and therefore, detailed descriptions of these units are omitted.

In the laser apparatus 30, an electrode 31 used for discharge operation is elongated along right/left directions, as viewed in this drawing, within a laser chamber 11. While a gaseous medium is supplied into the laser chamber 11, a high voltage is applied to the discharge electrode 31 by the high voltage power supply 22 so as to cause the discharge operation to occur in this laser chamber 11, so that the fluorescent light "$L_0$" is generated from the supplied gaseous medium.

A narrow-band module 32 having low resolution is arranged on the left side of the laser chamber 11. The narrow-band module 32 includes, for example, a prism, a total reflection mirror, and the like. The narrow-band module 32 separates the fluorescent light "$L_0$" into first emission light and second emission light. Another narrow-band module 33 having high resolution is arranged on the left side of the above-explained narrow-band module 32. The narrow-band module 33 includes, for example, an etalon and a total reflection mirror, and so on. The narrow-band module 33 causes a portion of the first emission light output from the narrow-band module 32 to be resonated between the own narrow-band module 33 and a partial reflection mirror 14, and then amplifies the resonated first emission light in order to narrow the bandwidth of this resonated first emission light. As a result, laser beam "$L_1$" is generated from the first emission light in the above-explained manner, and then, the laser beam "$L_1$" is output from the partial reflection mirror 14 directed to a beam splitter 17.

A mirror 34 is positioned on the right side of the laser chamber 31. The mirror 34 reflects the second emission light output from the narrow-band module 32 along a lower direction to supply a reference beam (reference light) "$L_2$". As a consequence, in the second embodiment, only the second emission light is contained in the reference beam "$L_2$", which is different from the first embodiment.

A slit plate 35 is arranged between the partial reflection mirror 14 and the mirror 34. A slit 36 is formed in the slit plate 35. The slit plate 35 may cause only the narrow-band first emission light made by the narrow-band module 33 to pass therethrough. As a consequence, both the first emission light and the second emission light whose bandwidths are not narrowed by the narrow-band module 34 are interrupted, or cut off by the slit plate 35.

The controller 21 controls the high voltage source 22 so as to adjust the voltage applied to the electrode 31. Also, the controller 21 calculates a difference value between the central wavelength of the laser beam "$L_1$" measured by the wavelength meter 20 and a target wavelength. Next, the controller 21 controls both the narrow-band module 32 and the narrow-band module 33 based upon this calculated difference value to adjust the central wavelength of the laser light "$L_1$" to the target wavelength.

As previously described in detail, in the second embodiment, since the fluorescent light "$L_0$" is spatially split, both the laser beam "$L_1$" and the reference beam "$L_2$" are generated to be utilized. Different from the first embodiment, this reference beam "$L_2$" contains only the second emission light. Although the precision of the laser apparatus according to the second embodiment is slightly lowered as compared with that of the laser apparatus according to the first embodiment, even when the central wavelength of the laser beam "$L_1$" is drifted and is not made stable, the laser beam "$L_1$" can be output while maintaining the central wavelength of the laser beam at the target wavelength in high precision.

Figure 4:
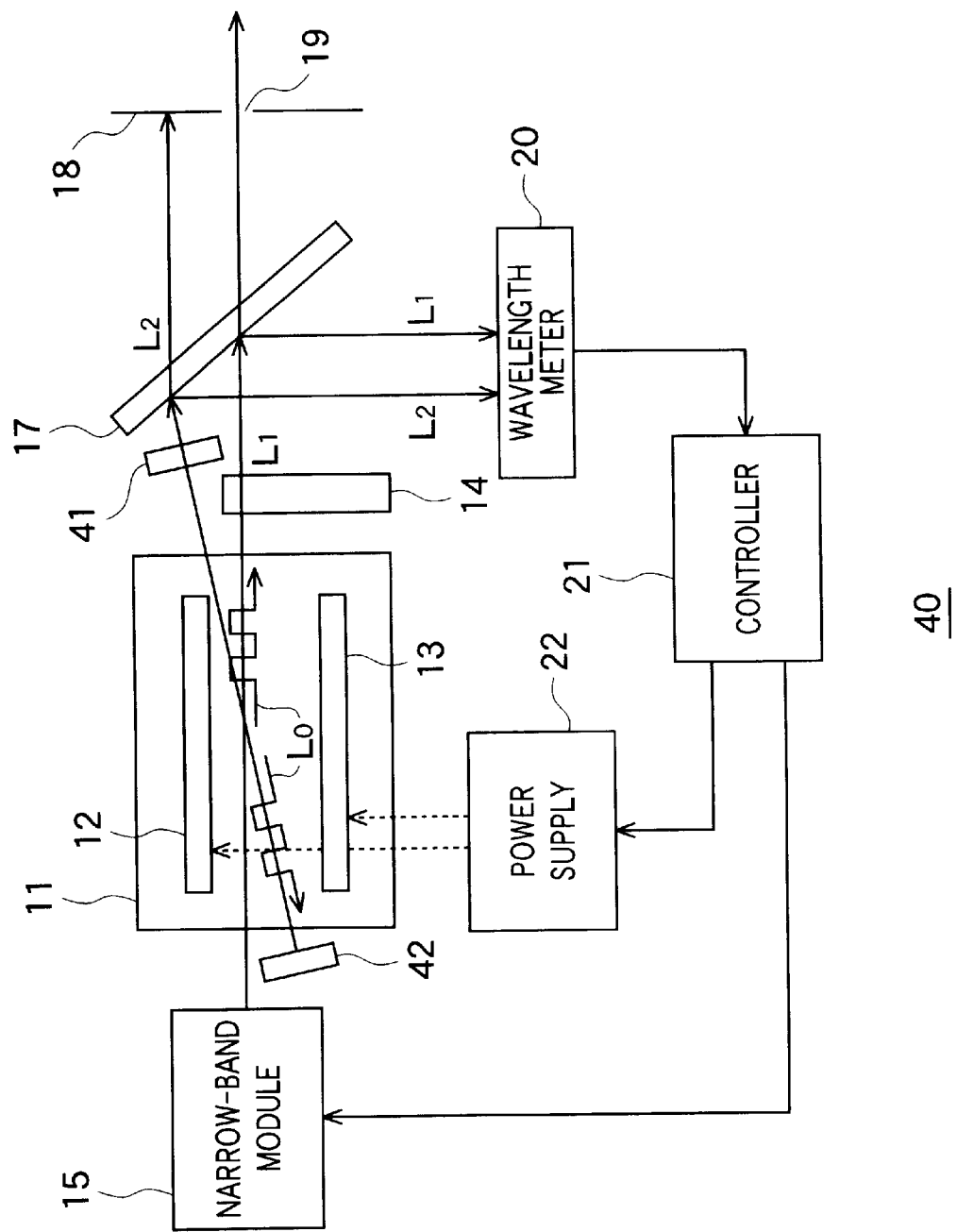
FIG. 4 schematically represents an overall arrangement of a laser apparatus according to a third embodiment of the present invention.

FIG. 4 illustratively shows an overall arrangement of a laser apparatus according to a third embodiment of the present invention. It should be noted that the same reference numerals as shown in FIG. 1 will be employed as those for denoting the same, or similar units in the third embodiment, and therefore, detailed descriptions of these units are omitted.

In this laser apparatus 40, another partial reflection mirror 41 is positioned on the right side of the partial reflection mirror 14. Also, a total reflection mirror 42 is arranged between the laser chamber 11 and the narrow-band module 15. Both the partial reflection mirror 41 and the total reflection mirror 42 constitute a second oscillation optical path which is intersected with the oscillation optional path of the laser beam "$L_1$". A portion of the fluorescent light "$L_0$" is resonated along this second oscillation optical path to be amplified. As a result, molecular fluorine laser beams whose bandwidth is not narrowed are generated from a portion of the fluorescent light "$L_0$", and then this molecular fluorescent laser beam is output as the reference beam "$L_2$" form the mirror 41 to the beam splitter 17.

As previously described in detail, according to the third embodiment, since the fluorescent light "$L_0$" is split along the oscillation direction thereof, both the laser beam "$L_1$" and the reference beam "$L_2$" are generated, which is different from the second embodiment. Also, similar to the first embodiment, both the first emission light and the second emission light are contained in the reference beam "$L_2$". As a consequence, the third embodiment can achieve a similar effect to that of the first embodiment.

Figure 5:
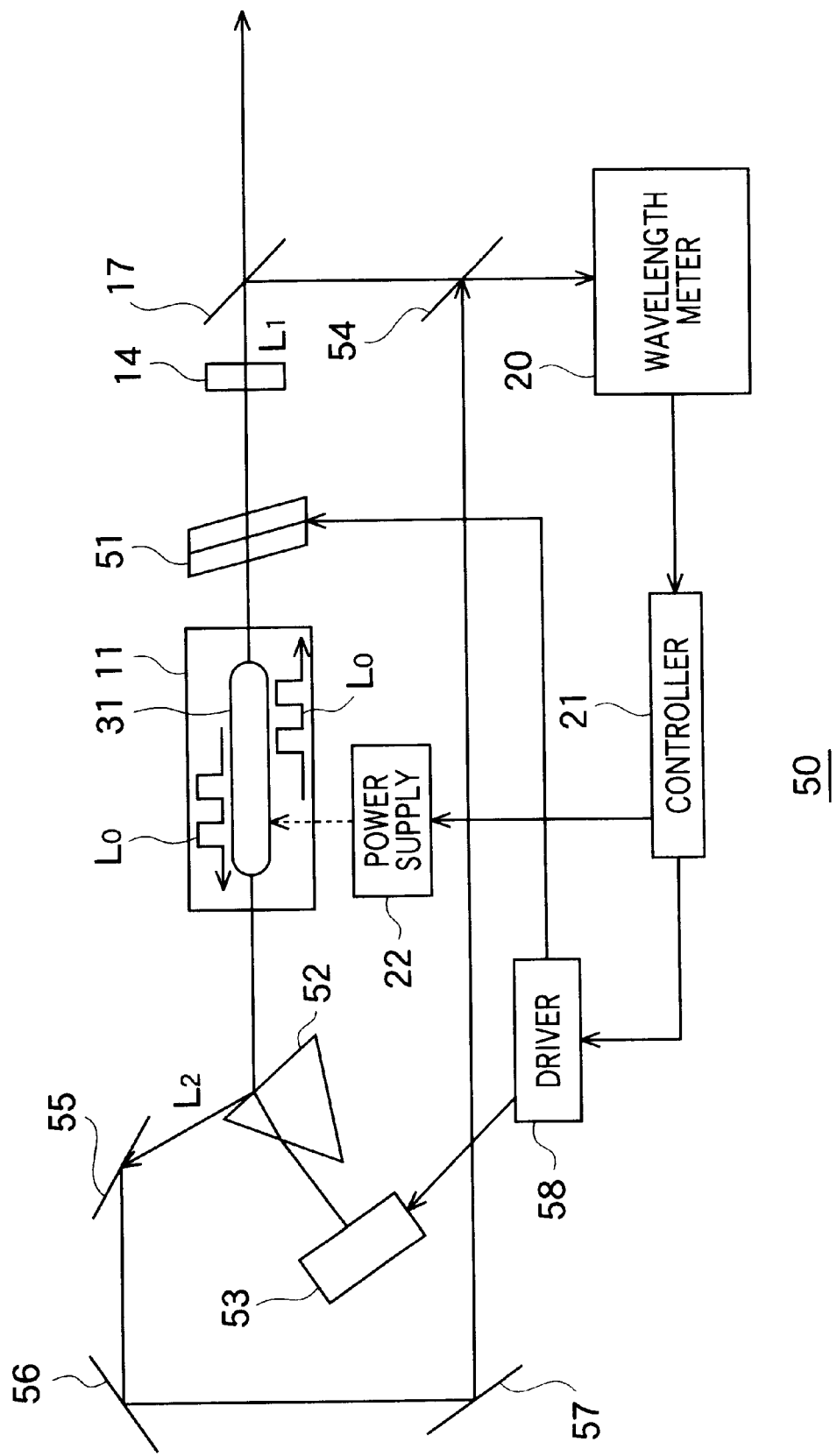
FIG. 5 schematically represents an overall arrangement of a laser apparatus according to a fourth embodiment of the present invention.

FIG. 5 illustratively shows an overall arrangement of a laser apparatus according to a fourth embodiment of the present invention. It should be noted that the same reference numerals as shown in FIG. 1 will be employed as those for denoting the same, or similar units in the fourth embodiment, and therefore, detailed descriptions of these units are omitted.

In the laser apparatus 50 according to the fourth embodiment, an etalon 51 is arranged in such a manner that this etalon 51 is rotatable between the laser chamber 11 and the partial reflection mirror 14. The etalon 51 may narrow a bandwidth of a portion of the first emission light contained in the fluorescent light "$L_0$". The arranging angle of this etalon 51 is controlled via a driver 58 by the controller 21.

A prism 52 is arranged on the left side of the laser chamber 11. The prism 52 separates a portion of the fluorescent light "$L_0$" into first emission light and second emission light, and also reflects another portion of the fluorescent light "$L_0$" along the upper direction.

A total reflection mirror 53 is arranged on the left side of the prism 52 in such a manner that the total reflection mirror 53 is rotatable. The total reflection mirror 53 resonates a portion of the first emission light whose bandwidth is made narrow by using the etalon 51 between the own total reflection mirror 53 and the partial reflection mirror 14, and then amplifies the resonated first emission light. Thus, the laser beam "$L_1$" is generated from the first emission light in this manner, and then is output from the partial reflection mirror 14 to the beam splitter 17. The arranging angle of the total reflection mirror 53 is controlled via the driver 58 by the controller 21.

Another beam splitter 54 is arranged on the lower side of the beam splitter 17. The beam splitter 54 splits the laser beam "$L_1$" reflected from the beam splitter 17 into two directions, and also reflects the reference light "$L_2$" which is penetrated through the three mirrors 55, 56, 57 along the lower direction. The wavelength meter 20 is arranged on the lower side of the beam splitter 54.

The controller 21 calculates a difference between a central wavelength of the laser beam "$L_1$" measured by the wavelength meter 20 and a target wavelength, and controls the respective arranging angles of the etalon 51 and the total reflection mirror 53 via the driver 58 based upon this calculated difference in order that the central wavelength of the laser beam "$L_1$" may be adjusted to the target wavelength.

As previously described in detail, according to the fourth embodiment, both the laser beam "$L_1$" and the reference beam "$L_2$" are generated from the fluorescent light "$L_0$" which is split by the prism 52 along the two directions. As a consequence, the laser apparatus 50 according to the fourth embodiment can achieve a similar effect to that of the first embodiment.

Alternatively, a shutter may be positioned between the beam splitter 17 and the beam splitter 54. Since this shutter is closed, the wavelength meter 20 may be calibrated by employing only, for example, the reference beam "$L_2$". Furthermore, a shutter may be arranged on the right side of the beam splitter 17. Since this shutter is closed, for instance, it is possible to avoid such a fact that while a wafer and/or a reticle is replaced, the laser beam "$L_1$" is unnecessarily output.

Figure 6:
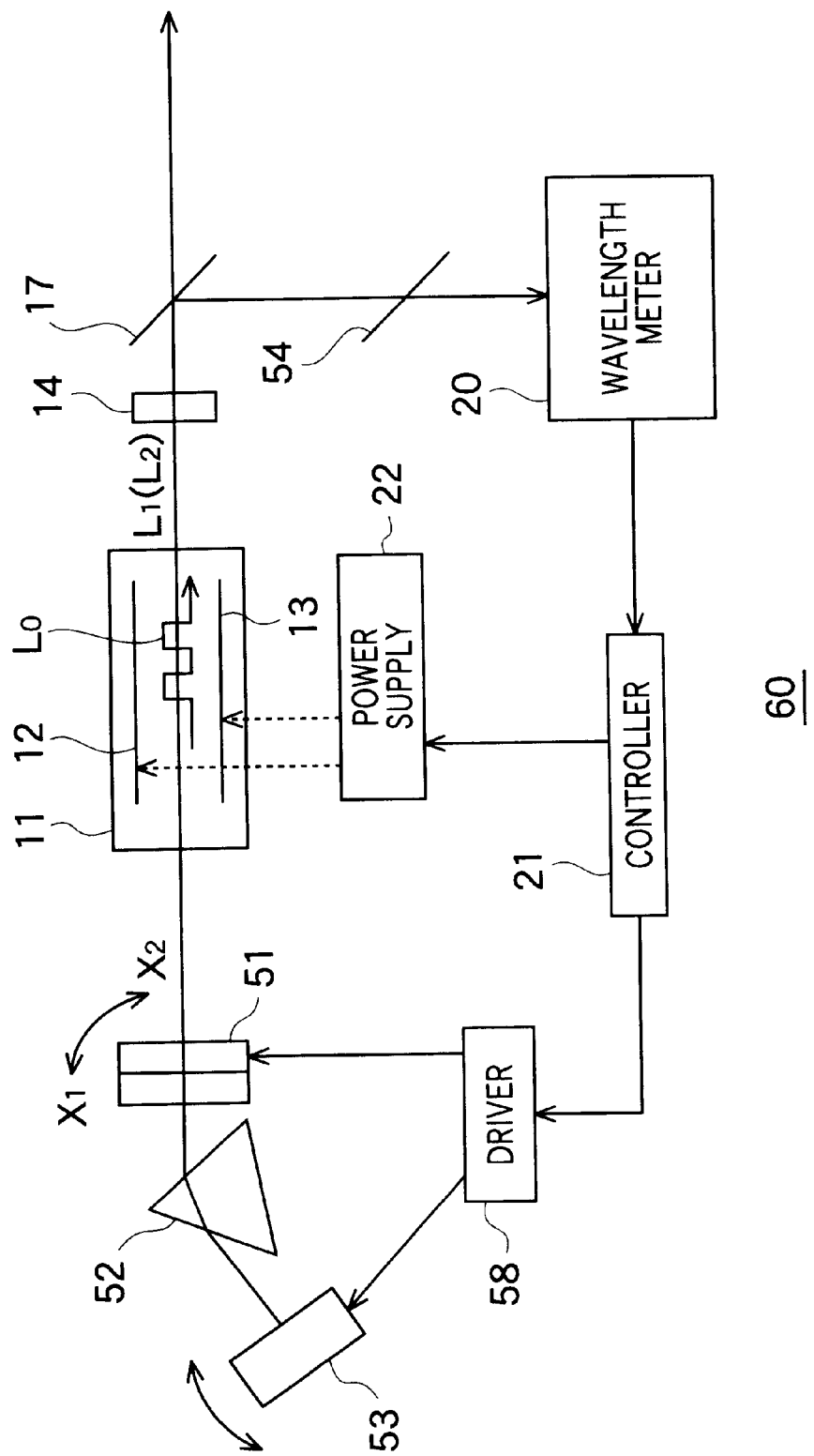
FIG. 6 schematically represents an overall arrangement of a laser apparatus according to a fifth embodiment of the present invention.

FIG. 6 illustratively shows an overall arrangement of a laser apparatus according to a fifth embodiment of the present invention. It should be noted that the same reference numerals as shown in FIG. 5 will be employed as those for denoting the same, or similar units in the fifth embodiment, and therefore, detailed descriptions of these units are omitted.

In the laser apparatus 60 according to the fifth embodiment, the etalon 51 is arranged in such a manner that this etalon 51 is rotatable between the laser chamber 11 and the prism 52 within an angle range defined between an angle "$X_1$" and an angle "$X_2$." The arranging angle of the etalon 51 is controlled via the driver 58 by the controller 21.

In such a case that the etalon 51 is arranged at the angle "$X_1$", while the first emission light contained in the fluorescent light "$L_0$" is resonated between the partial reflection mirror 14 and the total reflection mirror 53 and then the resonated first emission light is amplified, the bandwidth of this amplified first emission light is narrowed by the etalon 51. The laser beam "$L_1$" is generated from the first emission light in this manner, and then is output from the partial reflection mirror 14 toward the beam splitter 17.

On the other hand, in the case that the etalon 51 is arranged at the angle "$X_2$", this etalon 51 may function as a total reflection mirror. As a result, the fluorescent light "$L_0$" is resonated between the partial reflection mirror 14 and the etalon 51, and then, the resonated fluorescent light is amplified. As a result, molecular fluorine laser beams whose bandwidth is not narrowed are generated from the fluorescent light "$L_0$" in this manner, and thereafter, such a molecular fluorine laser beam is output as the reference beam "$L_2$" from the partial reflection mirror 14 toward the beam splitter 17.

In the laser apparatus 60 according to the fifth embodiment, both the laser beam "$L_1$" and the reference beam "$L_2$" are not entered into the wavelength meter 20 at the same time. As a consequence, according to the fifth embodiment, after the wavelength meter 20 measures, for instance, the respective central wavelengths of the first emission light and second emission light, which are contained in the reference beam "$L_2$", this wavelength meter 20 measures the central wavelength of the laser beam "$L_1$".

The controller 21 calculates a difference between a central wavelength of the laser beam "$L_1$" measured by the wavelength meter 20 and a target wavelength, and controls the respective arranging angles of the etalon 51 and the total reflection mirror 53 via the driver 58 based upon this calculated difference in order that the central wavelength of the laser beam "$L_1$" may be adjusted to the target wavelength.

Figure 7:
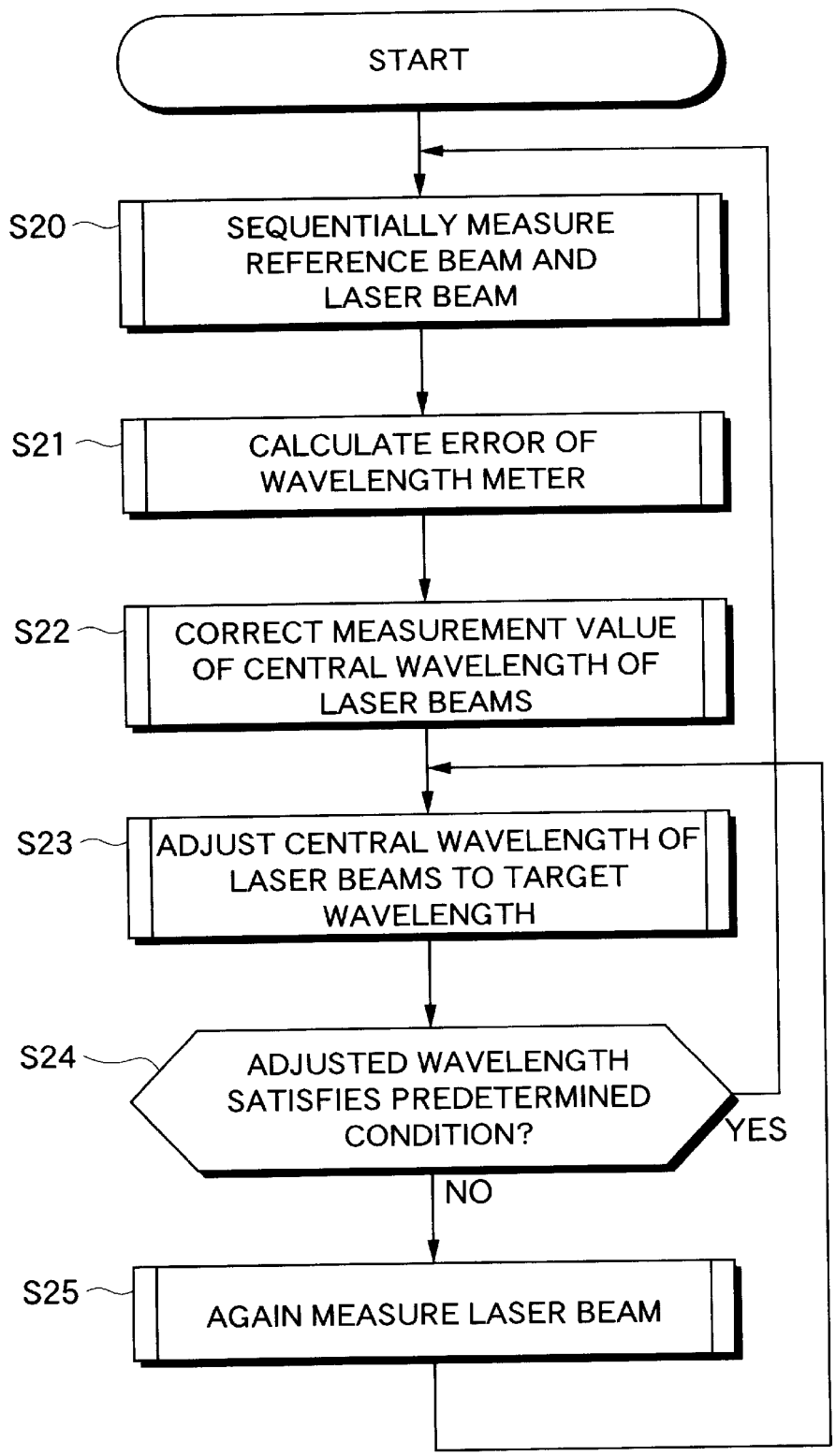
FIG. 7 is a flow chart for explaining an example of a calibration process of the laser apparatus as shown in FIG. 6.

Referring now to FIG. 7, an example of a calibration process of the laser apparatus 60 according to the fifth embodiment will be described.

First, at step S20, both a central wavelength of the first emission light and a central wavelength of the second emission light, which are contained in the reference beam "$L_2$", and further a central wavelength of the laser beam "$L_1$" are separately measured by using the wavelength meter 20.

Next, at step S21, an error caused by the wavelength meter 20 is acquired based upon the central wavelength of the first emission light and the central wavelength of the second emission light measured by the wavelength meter 20.

Furthermore, at step S22, the measurement value of the central wavelength of the laser light "$L_1$" acquired at step S20 is corrected based upon the error acquired at step S21.

Then, at step S23, the controller 21 controls the narrow-band module 15 based on the corrected central wavelength value of the laser beam "$L_1$" acquired at step S22, so that the central wavelength of the laser beam "$L_1$" is adjusted to a target wavelength.

Subsequently, at step S24, the controller 21 judges as to whether or not a measurement condition of the reference beam "$L_2$" may satisfy the below-mentioned conditions:

(1) a change in gas temperatures within the wavelength meter 20;
(2) a change in gas pressure within the wavelength meter 20;
(3) a change in oxygen concentration;
(4) a change in humidity;
(5) elapsed time after the preceding calibration is carried out;
(6) a change in temperatures of the wavelength meter 20; and
(7) an instruction being issued by way of external operation.

When the controller 21 judges that the measurement condition of the reference beam "$L_2$" satisfies the above-explained conditions (1) to (7), the calibration process is advanced to step S20. To the contrary, in such a case that the controller 21 judges such a fact that the measurement condition of the reference beam "$L_2$" does not correspond to any of the above-explained conditions (1) to (7), the calibration process is advanced to a further step S24. At step S24, a central wavelength of the laser beam "$L_1$" is again measured by the wavelength meter 20. Thereafter, this calibration process is advanced to the previous step S23. In the case that such an instruction for prohibiting the measurement of the reference beam "$L_2$" is present at step S23, the calibration process is advanced to step S24 irrespective of whether or not the measurement condition of the reference beam "$L_2$" satisfies the above-mentioned conditions (1) to (7).

As previously described in detail, according to the fifth embodiment, since the arranging angle of the etalon 51 is controlled, the generation of the laser beam "$L_1$" and the generation of the reference beam "$L_2$" are switched. As a consequence, the laser beam "$L_1$" and the reference beam "$L_2$" are separately entered into the wavelength meter 20. Therefore, according to the fifth embodiment, although the characteristics of the wavelength meter 20 which are varied in response to the environments cannot be grasped in real time, a similar effect to that of the first embodiment can be achieved.

Figure 8:
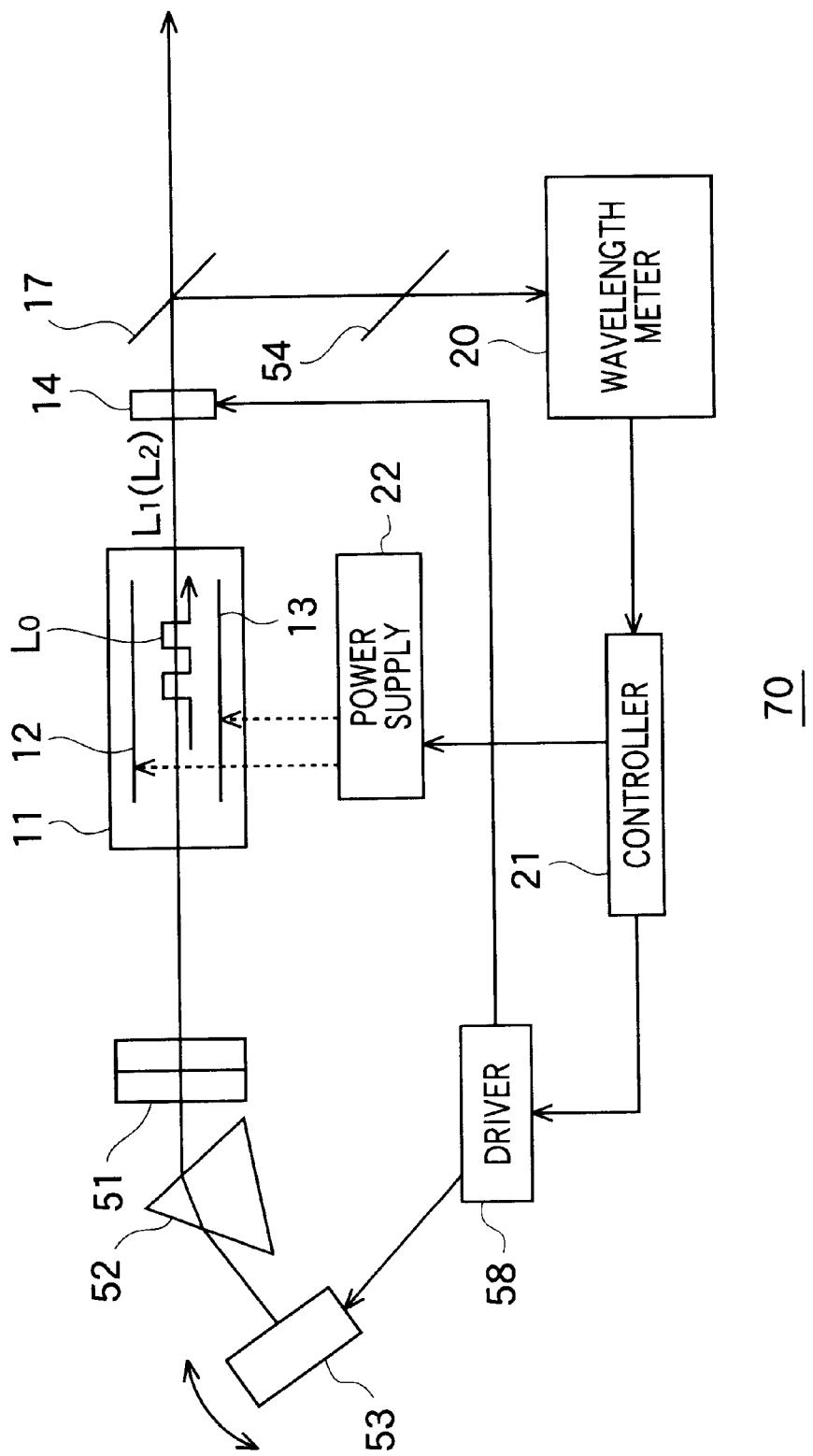
FIG. 8 schematically indicates an overall arrangement of a laser apparatus according to a sixth embodiment of the present invention.

FIG. 8 illustratively shows an overall arrangement of a laser apparatus according to a sixth embodiment of the present invention. It should be noted that the same reference numerals as shown in FIG. 6 will be employed as those for denoting the same, or similar units in the sixth embodiment, and therefore, detailed descriptions of these units are omitted.

In the laser apparatus 70 according to the sixth embodiment, the partial reflection mirror 14 is arranged in such a manner that this partial reflection mirror 14 is rotatable between the laser chamber 11 and the beam splitter 17, which is different from the above-explained fifth embodiment. The arranging angle of the partial reflection mirror 14 is controlled via the driver 58 by the controller 21. In the sixth embodiment, since the respective arranging angles of the partial reflection mirror 14 and the total reflection mirror 53 are controlled, a generation of a laser beam "$L_1$" and a generation of a reference beam "$L_2$" are switched.

That is to say, in the case that the laser beam "$L_1$" is to be generated, the respective arranging angles of both the partial reflection mirror 14 and the total reflection mirror 53 are controlled via the driver 58 by the controller 21 in such a way that first emission light contained in fluorescent light "$L_0$" may be resonated between the partial reflection mirror 14 and the total reflection mirror 53. As a result, while the first emission light is resonated between the partial reflection mirror 14 and the total reflection mirror 53 and then the resonated first emission light is amplified, the bandwidth of this amplified first emission light is narrowed by the etalon 51. Thus, the laser beam "$L_1$" may be generated from the first emission light, and is output from the partial reflection mirror 14 toward the beam splitter 17.

On the other hand, in the case that the reference beam "$L_2$" is to be generated, the respective arranging angles of both the partial reflection mirror 14 and the total reflection mirror 53 are controlled via the driver 58 by the controller 21 in such a way that first emission light contained in fluorescent light "$L_0$" is not resonated between the partial reflection mirror 14 and the total reflection mirror 53. Accordingly, the fluorescent light "$L_0$", which is propagated from the laser chamber 11 to the partial reflection mirror 14, is output as the reference beam "$L_2$" from the partial reflection mirror 14 to the beam splitter 17.

The controller 21 calculates a difference between a central wavelength of the laser beam "$L_1$" measured by the wavelength meter 20 and a target wavelength, and controls the respective arranging angles of the partial reflection mirror 14 and the total reflection mirror 53 via the driver 58 based upon this calculated difference in order that the central wavelength of the laser beam "$L_1$" may be adjusted to the target wavelength.

As previously described in detail, according to the sixth embodiment, since the respective arranging angles of the partial reflection mirror 14 and the total reflection mirror 53 are controlled, the generation of the laser beam "$L_1$" and the generation of the reference beam "$L_2$" are switched. As a consequence, the laser beam "$L_1$" and the reference beam "$L_2$" are separately entered into the wavelength meter 20 similar to the fifth embodiment. Therefore, according to the sixth embodiment, a similar effect to that of the fifth embodiment can be achieved.

Figure 9:
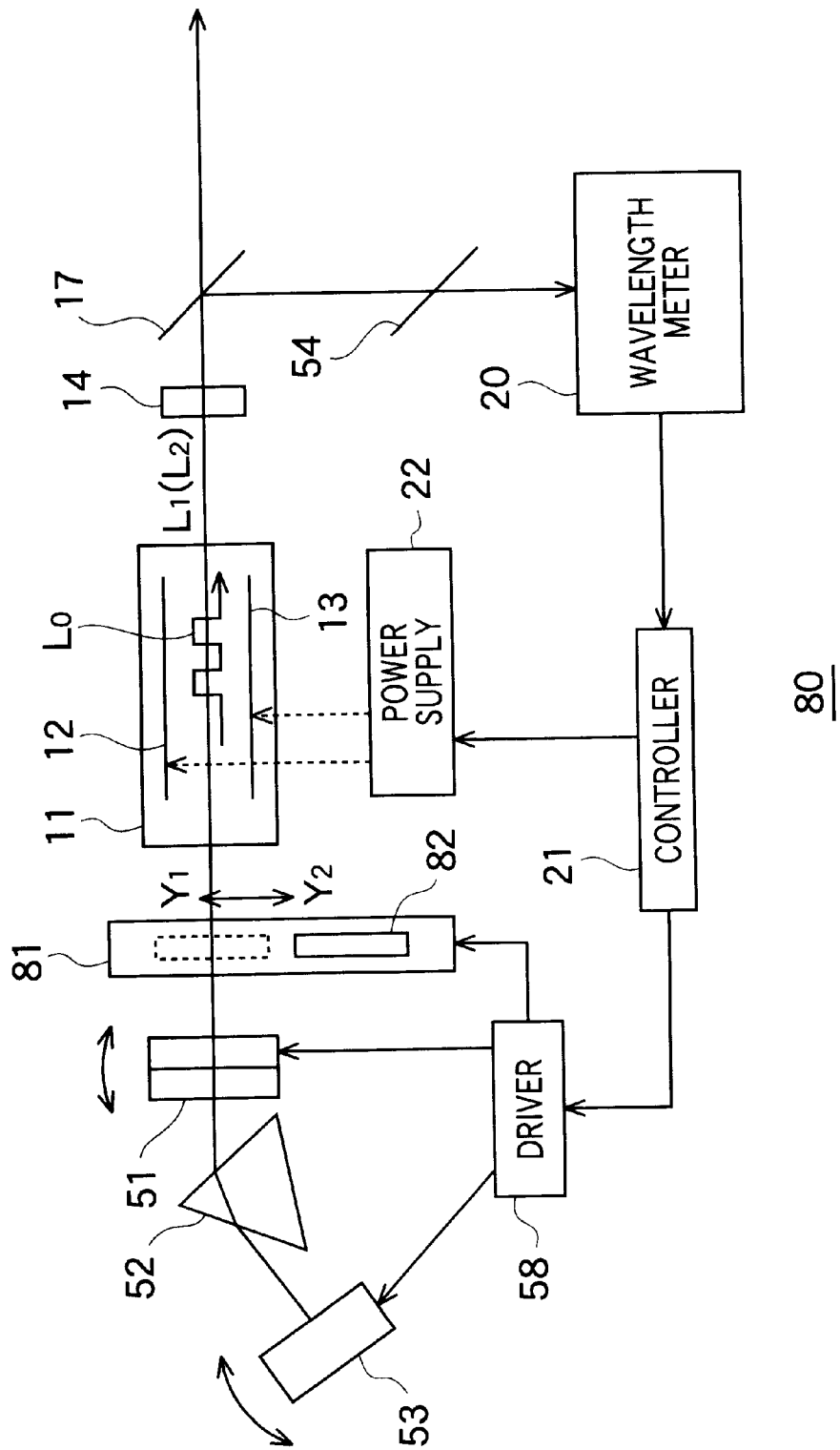
FIG. 9 schematically indicates an overall arrangement of a laser apparatus according to a seventh embodiment of the present invention.

FIG. 9 illustratively shows an overall arrangement of a laser apparatus according to a seventh embodiment of the present invention. It should be noted that the same reference numerals as shown in FIG. 1 will be employed as those for denoting the same, or similar units in the seventh embodiment, and therefore, detailed descriptions of these units are omitted.

In the laser apparatus 80 according to the seventh embodiment, a stage 81 is positioned between the laser chamber 11 and the etalon 51. Further, a total reflection mirror 82 is arranged in such a manner that this total reflection mirror 82 can be moved between a position "$Y_1$" and another position "$Y_2$". The arranging position of the total reflection mirror 82 is controlled in such a manner that the stage 81 is manipulated via the driver 58 by the controller 21. In the seventh embodiment, since the arranging position of the total reflection mirror 82 is controlled, a generation of a laser beam "$L_1$" and a generation of a reference beam "$L_2$" may be switched.

In other words, in such a case that the total reflection mirror 82 is arranged at the position "$Y_1$", the fluorescent light "$L_0$" can not be reached to the etalon 51. As a result, the fluorescent light "$L_0$" is resonated between the partial reflection mirror 14 and the total reflection mirror 82 and then is amplified. Thus, molecular fluorine laser beams whose bandwidth is not narrowed are generated from the fluorescent light "$L_0$" in this manner, and this molecular fluorine laser beam is output as a reference beam "$L_2$" from the partial reflection mirror 14 toward the beam splitter 17.

On the other hand, in the case that the total reflection mirror 82 is arranged on the position "$Y_2$", the fluorescent light "$L_0$" can be reached to the etalon 51. As a result, while the first emission light contained in the fluorescent "$L_0$" is resonated between the partial reflection mirror 14 and the total reflection mirror 15 and then is amplified, the bandwidth of the resonated first emission light is narrowed by using the etalon 51. Thus, the laser beam "$L_1$" is generated from the first emission light, and is output from the partial reflection mirror 14 to the beam splitter 17.

As previously described in detail, according to the seventh embodiment, since the arranging position of the total reflection mirror 82 is controlled, the generation of the laser beam "$L_1$" and the generation of the reference beam "$L_2$" are switched. As a consequence, similar to the fifth embodiment and the sixth embodiment, both the laser beam "$L_1$" and the reference beam "$L_2$" are separately entered into the wavelength meter 20. Accordingly, the seventh embodiment can achieve a similar effect to that of the fifth and sixth embodiments.

Figure 10:
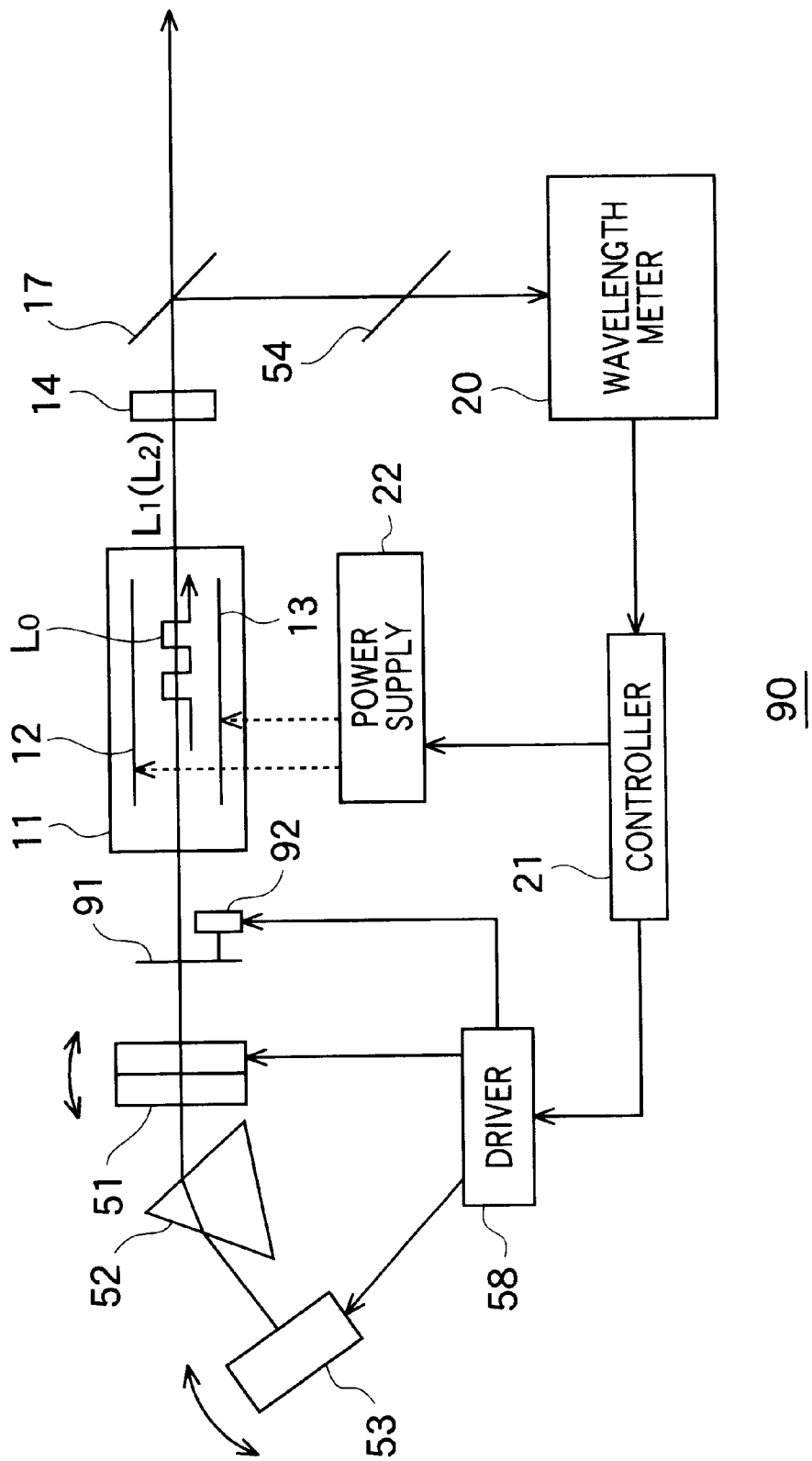
FIG. 10 schematically indicates an overall arrangement of a laser apparatus according to an eighth embodiment of the present invention.

FIG. 10 illustratively shows an overall arrangement of a laser apparatus according to a eighth embodiment of the present invention. It should be noted that the same reference numerals as shown in FIG. 1 will be employed as those for denoting the same, or similar units in the eighth embodiment, and therefore, detailed descriptions of these units are omitted.

In the laser apparatus 90 according to the eighth embodiment, a shield plate 91 is arranged between the laser chamber 11 and the etalon 51, instead of the stage 81 and the total reflection mirror 82. Alternatively, this shield plate 91 may be arranged between the prism 52 and the etalon 51, and/or between the prism 52 and the total reflection mirror 53. The shield plate 91 is opened/closed by controlling a solenoid 92 via the driver 58 by the controller 21. In the laser apparatus 90 according to the eighth embodiment, since the shield plate 91 is opened/closed, a generation of a laser beam "$L_1$" and a generation of a reference beam "$L_2$" are switched.

In other words, when the shield plate 91 is closed, the fluorescent light "$L_0$" cannot be reached to the etalon 51. As a result, the fluorescent light "$L_0$" is resonated between the partial reflection mirror 14 and the shield plate 91 and then is amplified. Thus, molecular fluorine laser beams whose bandwidth is not narrowed are generated from the fluorescent light "$L_0$" in this manner, and this molecular fluorine laser beam is output as a reference beam "$L_2$" from the partial reflection mirror 14 toward the beam splitter 17.

On the other hand, in the case that the shield plate 91 is opened, the fluorescent light "$L_0$" can be reached to the etalon 51. As a result, while the first emission light contained in the fluorescent "$L_0$" is resonated between the partial reflection mirror 14 and the shield plate 91 and then is amplified, the bandwidth of the resonated first emission light is narrowed by using the etalon 51. Thus, the laser beam "$L_1$" is generated from the first emission light, and is output from the partial reflection mirror 14 to the beam splitter 17.

As previously described in detail, according to the eighth embodiment, since the shield plate 91 is opened/closed, the generation of the laser beam "$L_1$" and the generation of the reference beam "$L_2$" are switched. As a consequence, similar to the fifth embodiment to the seventh embodiment, both the laser beam "$L_1$" and the reference beam "$L_2$" are separately entered into the wavelength meter 20. Accordingly, the eighth embodiment can achieve a similar effect to that of the fifth to seventh embodiments.

Figure 11:
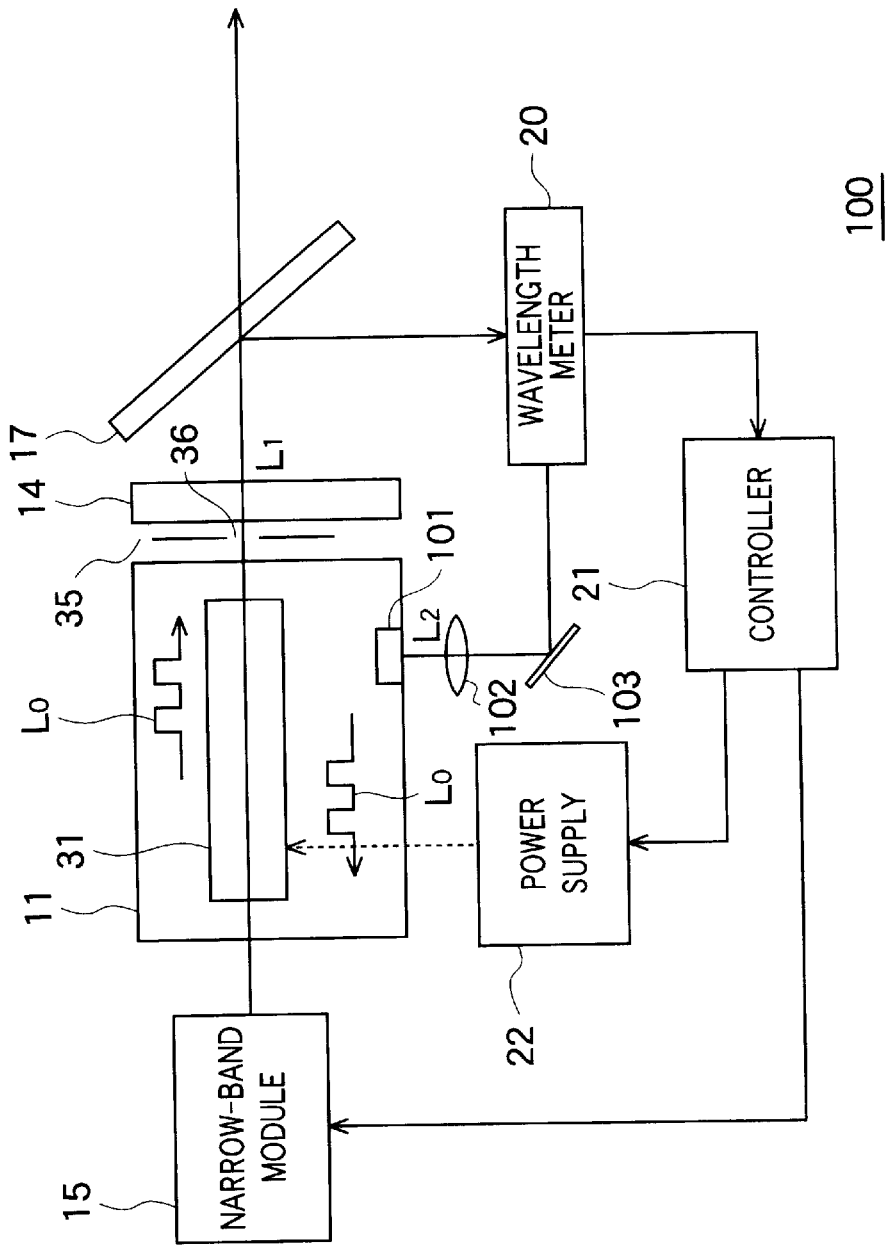
FIG. 11 schematically indicates an overall arrangement of a laser apparatus according to a ninth embodiment of the present invention.

FIG. 11 illustratively shows an overall arrangement of a laser apparatus according to a ninth embodiment of the present invention. It should be noted that the same reference numerals as shown in FIG. 1 will be employed as those for denoting the same, or similar units in the ninth embodiment, and therefore, detailed descriptions of these units are omitted.

In the laser apparatus 100 according to the ninth embodiment, a chamber window 101 is mounted on one side wall of the laser chamber 11. In the ninth embodiment, fluorescent light "$L_0$" which passes through the chamber window 101 is utilized as a reference beam "$L_2$".

Both a lens 102 and a mirror 103 are arranged in this order on the lower side of the chamber widow 101, and furthermore, the wavelength meter 20 is arranged on the right side of the mirror 103. The lens 102 collects a portion of the reference beam "$L_2$" output from the chamber window 101 toward the mirror 103. The mirror 103 reflects the reference beam "$L_2$" which passes through the lens 102 toward the wavelength meter 20.

As previously explained, according to the ninth embodiment, the fluorescent light "$L_0$", which has passed through the chamber window 101, is utilized as the reference beam "$L_2$". Similar to the first embodiment, in the ninth embodiment, both the laser beam "$L_1$" and the reference beam "$L_2$" are entered into the wavelength meter 20 at the same time. As a result, the ninth embodiment can achieve a similar effect to that of the first embodiment.

Figure 12:
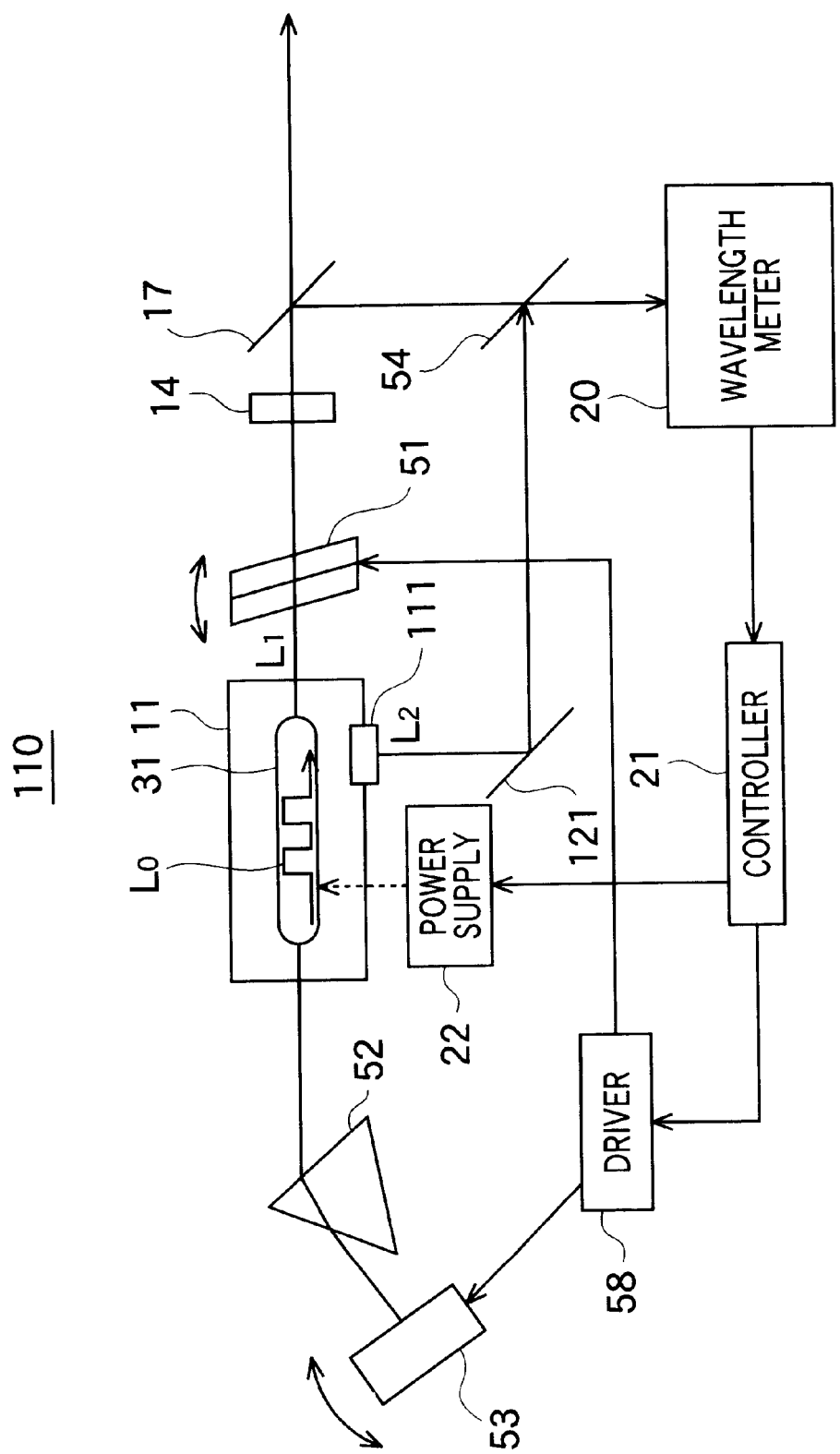
FIG. 12 schematically indicates an overall arrangement of a laser apparatus according to a tenth embodiment of the present invention.

FIG. 12 illustratively shows an overall arrangement of a laser apparatus according to a tenth embodiment of the present invention. It should be noted that the same reference numerals as shown in FIG. 1 will be employed as those for denoting the same, or similar units in the tenth embodiment, and therefore, detailed descriptions of these units are omitted.

In the laser apparatus 110 according to the tenth embodiment, a chamber window 111 is mounted on one side wall of the laser chamber 11. In the tenth embodiment, fluorescent light "$L_0$", which passes through the chamber window 111, is utilized as a reference beam "$L_2$".

A mirror 112 is arranged on the lower side of the mirror 112. Furthermore, a beam splitter 54 is arranged on the right side of the chamber window 111. The mirror 112 reflects a portion of the reference beam "$L_2$" output from the chamber window 111 toward the beam splitter 54.

As previously explained, according to the tenth embodiment, the fluorescent light "$L_0$", which has passed through the chamber window 111, is utilized as the reference beam "$L_2$". As a result, the tenth embodiment can achieve a similar effect to that of the ninth embodiment.

Figure 13:
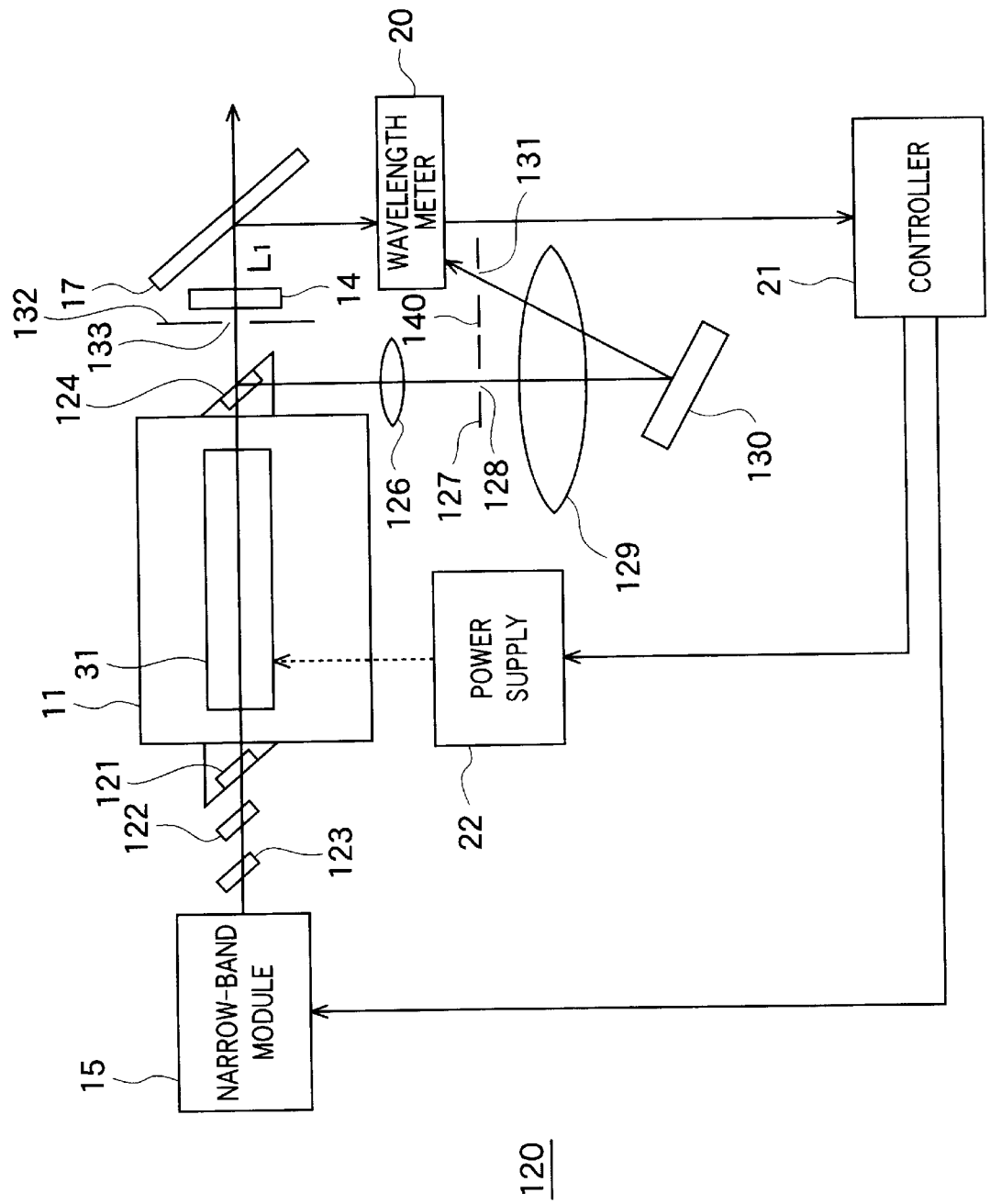
FIG. 13 schematically indicates an overall arrangement of a laser apparatus according to an 11th embodiment of the present invention.

FIG. 13 illustratively shows an overall arrangement of a laser apparatus according to an 11th embodiment of the present invention. It should be noted that the same reference numerals as shown in FIG. 1 will be employed as those for denoting the same, or similar units in the 11th embodiment, and therefore, detailed descriptions of these units are omitted.

In the laser apparatus 120 according to the 11th embodiment, a chamber window 121 is mounted on a left-sided wall of the laser chamber 11 in such a manner that this chamber window 121 may define the Brewster's angle with respect to an oscillation direction of the laser light "$L_1$". As a result, a portion of S-polarization light (S-polarized light) contained in fluorescent light "$L_0$" (namely, 20% of S-polarization light contained in fluorescent light "$L_0$" in the 11th embodiment) passes through the chamber window 121.

Two sets of Brewster's windows 122 and 123 are arranged between the narrow-band module 15 and the chamber window 121 in such a manner that these Brewster's windows 122 and 123 may define the Brewster's angles with respect to the oscillation direction of the laser beam "$L_1$". As a consequence, in the 11th embodiment, a major portion of the fluorescent light "$L_0$", which is reached to the narrow-band module 15, corresponds to P-polarization light (P-polarized light), and while the P-polarization light is resonated between the partial reflection mirror 14 and the narrow-band module 15 and is amplified, the bandwidth of this amplified P-polarization light is made narrow. A laser beam "$L_1$" is generated from the P-polarization light in this manner, and then is output from the partial reflection mirror 14 toward the beam splitter 17.

Also, another chamber window 124 is mounted on a right-sided wall of the laser chamber 11 in such a manner that this chamber window 124 may define the Brewster's angle with respect to the oscillation direction of the laser light "$L_1$". As a result, a major portion of S-polarization light contained in fluorescent light "$L_0$" (namely, 80% of S-polarization light contained in fluorescent light "$L_0$" in the 11th embodiment), which is propagated from the laser chamber 11 along the right direction, is reflected as a reference beam "$L_2$" from the chamber window 124 along the lower direction. Alternatively, a slit plate 132 may be arranged between the partial reflection mirror 14 and the chamber window 124. A slit 133 is formed on this slit plate 132, and this slit 133 may cause only P-polarization light whose bandwidth has been narrowed to pass therethrough. In this alternative case, both the P-polarization light and the S-polarization light, the bandwidths of which are not yet narrowed by the narrow-band module 15, may be cut off by the slit plate 132.

A lens 126 is arranged on the lower side of the chamber window 124. The lens 126 collects the reference beam "$L_2$" output from the chamber window 124 along the lower direction. Another slit plate 127 is arranged on the lower side of the lens 126. Another slit 128 is formed in this slit plate 127, and this slit 128 may cause a portion of such reference beam "$L_2$", which has penetrated the lens 126, to pass therethrough.

A collimator lens 129 is arranged on the lower side of the slit plate 127. This collimator lens 129 collimates the reference beams "$L_2$" which have passed through the slit 128. A grating 130 is arranged on the lower side of the collimator lens 129. The grating 130 diffracts the collimated reference beam "$L_2$" along the upper direction, so that this collimated reference beam "$L_2$" is solved into wavelength components. The arranging angle of the grating 130 is set in such a manner that a desirable wavelength component contained in the reference beam "$L_2$" is diffracted from the grating 130 along a preselected direction.

Another slit plate 140 is arranged on the right side of the above-explained slit plate 127. In this slit plate 140, another slit 131 is formed which may cause a portion (containing desirable wavelength component) of the reference beam "$L_2$", which has passed through the collimator Lens 129, to pass through the own slit 131. The reference beam "$L_2$", which has passed through the slit 131, is entered into the wavelength meter 20.

As previously described in detail, according to the 11th embodiment, since the fluorescent light "$L_0$" is subdivided into both the P-polarization light and the S-polarization light, both the laser beam "$L_1$" and the reference beam "$L_2$" are generated. Similar to the first embodiment, both the laser beam "$L_1$" and the reference beam "$L_2$" are entered into the wavelength meter 20 at the same time in the 11th embodiment. As a consequence, the 11th embodiment may achieve a similar effect to that of the first embodiment.

It should also be noted that instead of the above-explained fluorescent light "$L_0$", an ASE (Amplified Spontaneous Emission) light produced by amplifying the fluorescent light "$L_0$" by the electrode 31 may be utilized as the reference beam "$L_2$". In this alternative case, such reference beams "$L_2$", whose intensity is high, may be generated.

Figure 14:
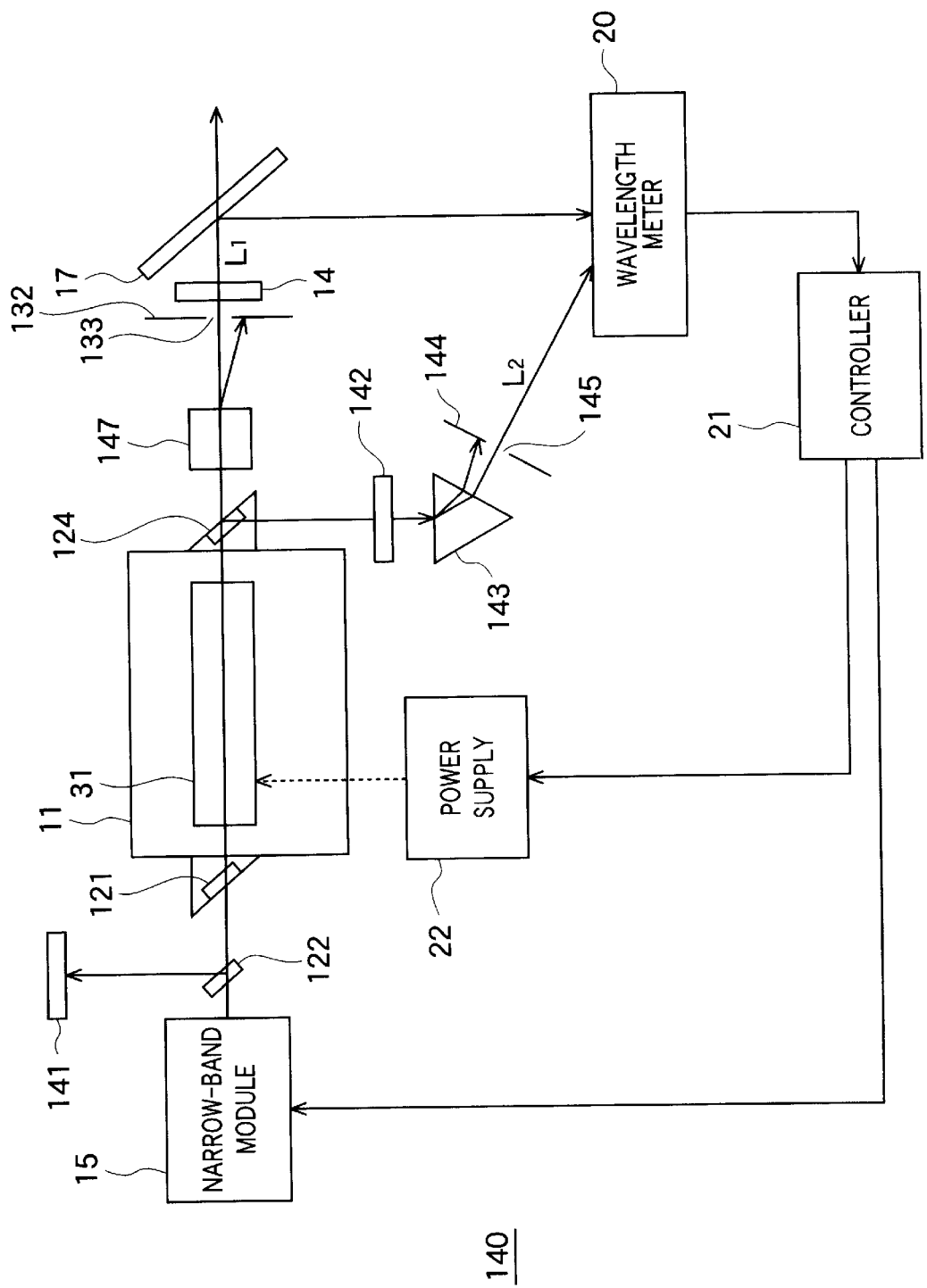
FIG. 14 schematically indicates an overall arrangement of a laser apparatus according to a 12th embodiment of the present invention.

FIG. 14 illustratively shows an overall arrangement of a laser apparatus according to a 12th embodiment of the present invention. It should be noted that the same reference numerals as shown in FIG. 13 will be employed as those for denoting the same, or similar units in the 12th embodiment, and therefore, detailed descriptions of these units are omitted.

In the laser apparatus 140 according to the 12th embodiment, a total reflection mirror 141 is arranged on the upper side of the Brewster's window 122, whereas a partial reflection mirror 142 is arranged on the lower side of the chamber window 124. Both the total reflection mirror 141 and the partial reflection mirror 142 may resonate S-polarization light (S-polarized light) contained in fluorescent light "$L_0$" and may amplify the resonated S-polarization light. Thus, molecular fluorine laser beams whose bandwidth is not yet narrowed are generated from the S-polarization light in this manner, and then, this molecular fluorescent laser beam is output as a reference beam "$L_2$" from the partial reflection mirror 142 along the lower direction.

A prism 143 is positioned on the lower side of the partial reflection mirror 142. The prism 143 solves the reference beam "$L_2$" output from the partial reflection mirror 142 to obtain a wavelength component in low resolution. The arranging angle of this prism 143 is set in such a manner that a desirable wavelength contained in the reference beam "$L_2$" is diffracted from this prism 143 along a preselected direction. A slit plate 144 is arranged on the lower side of the prism 143. A slit 145 is formed in this slit plate 144, and this slit 145 may cause a portion (containing desirable wavelength component) of the reference beam "$L_2$", which has passed through the prism 143, to pass therethrough. The reference beam "$L_2$", which has passed the slit 145, is reflected from the mirror 146 toward the beam splitter 17.

It should also be understood that a polarization prism 147 may be arranged between the chamber window 124 and the slit plate 133. In this alternative case, a ratio of the S-polarization light contained in the laser beam "$L_1$" to this laser beam "$L_1$" may be further suppressed to a low value.

As previously described in detail, according to the 12th embodiment, since the fluorescent light "$L_0$" is subdivided into both the P-polarization light and the S-polarization light, both the laser beam "$L_1$" and the reference beam "$L_2$" are generated similar to the 11th embodiment. As a consequence, the 12th embodiment may achieve a similar effect to that of the first embodiment.

Figure 15:
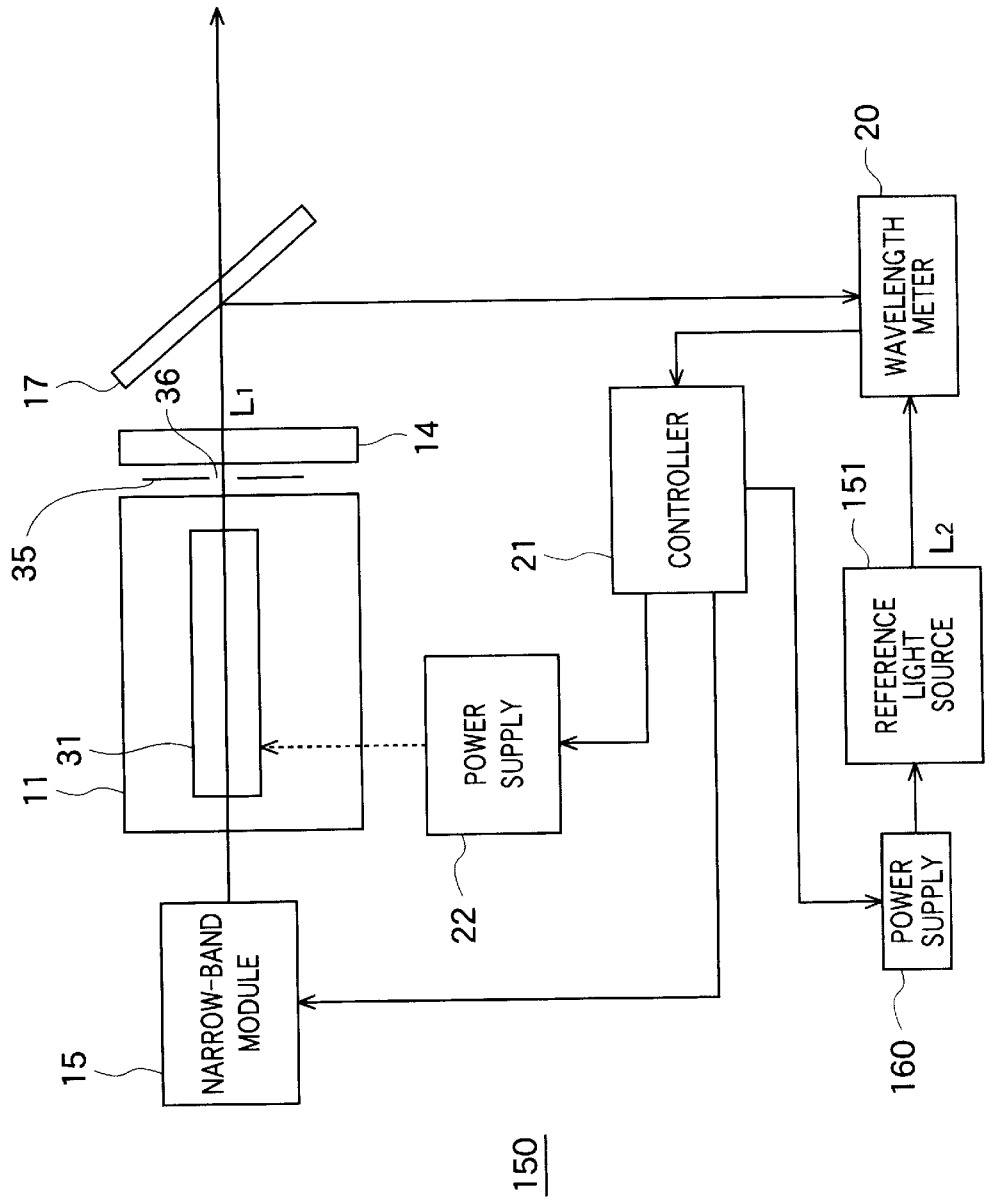
FIG. 15 schematically indicates an overall arrangement of a laser apparatus according to a 13th embodiment of the present invention.

FIG. 15 illustratively shows an overall arrangement of a laser apparatus according to a 13th embodiment of the present invention. It should be noted that the same reference numerals as shown in FIG. 1 will be employed as those for denoting the same, or similar units in the 13th embodiment, and therefore, detailed descriptions of these units are omitted.

Figure 16:
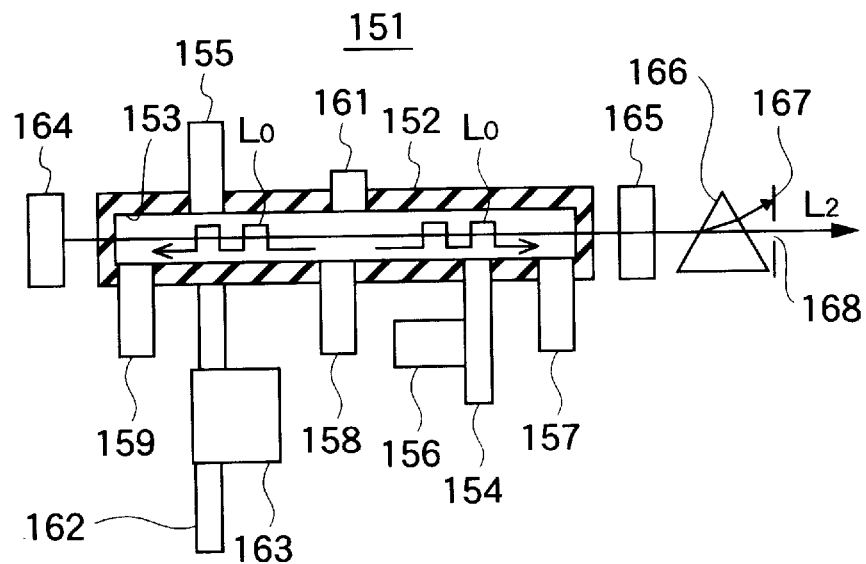
FIG. 16 is a sectional view indicating an example of a concrete structure of the reference light source as shown in FIG. 15.

The laser apparatus 150 according to the 13th embodiment is provided with a reference light source 151 capable of outputting molecular fluorine laser beams, whose bandwidth is not yet narrowed, as a reference beam "$L_2$". As shown in FIG. 16, the reference light source 151 is arranged by employing a housing 152 as a center member. This housing 152 owns a hallow portion 153 for generating fluorescent light "$L_0$".

A supply port 154 and an exhaust port 155 are mounted on this housing 152. The supply port 154 is employed so as to supply the same gaseous medium as that in the laser chamber 11 into the hallow portion 153. The exhaust port 155 is employed in order to exhaust the gaseous medium from the hallow portion 153. A pressure meter 156 is mounted on the supply port 154, and is used to measure pressure in the hallow portion 153.

Also, three sets of electrodes 157–159 are mounted on the housing 152. These electrodes 157–159 are used to induce a discharging operation into the hallow portion 153. A high voltage for this discharging operation is applied to these electrodes 157–159 by a high voltage power supply 160 (see FIG. 15). As a result, while the gaseous medium is supplied to the hallow portion 153 and the high voltage is applied to the electrodes 157–159 in order to induce the discharging operation, fluorescent light "$L_0$" is generated in this hallow portion 153.

Furthermore, a temperature meter 161 and a supply tube 162 are mounted on this housing 152. This temperature meter 161 is used to measure a temperature of this hallow portion 153. The supply tube 162 is employed so as to supply a cooling medium (for example, water or liquid nitrogen) inside the wall of the housing 152. A temperature controller 163 is mounted on the supply tube 162. The temperature controller 163 controls a supply amount of the cooling medium based upon a measurement value of the temperature meter 161 so as to adjust the temperature of the hallow portion 153. Since the temperature controller 163 controls the supply amount of the cooling medium based upon the measurement value of the temperature 161, this temperature control 163 may maintain the temperature of the hallow portion 153 at a sufficiently low value.

A total reflection mirror 164 is arranged on the left side of the housing 152, whereas the partial reflection mirror 165 is arranged on the right side of the housing 152. Both the total reflection mirror 164 and the partial reflection mirror 165 constitute a resonant unit capable of resonating the fluorescent light "$L_0$" and amplifying the resonated fluorescent light. As a result, molecular fluorine laser beams whose bandwidth is not yet narrowed are generated from the fluorescent light "$L_0$" in this manner, and then, this molecular fluorine laser beam may be output as a reference beam "$L_2$" from the partial reflection mirror 165. In other words, according to the 13th embodiment, the molecular fluorine laser beams, whose bandwidth is not narrowed, may be generated from the fluorescent light "$L_0$" in accordance with the lateral excitation system.

Figure 17:
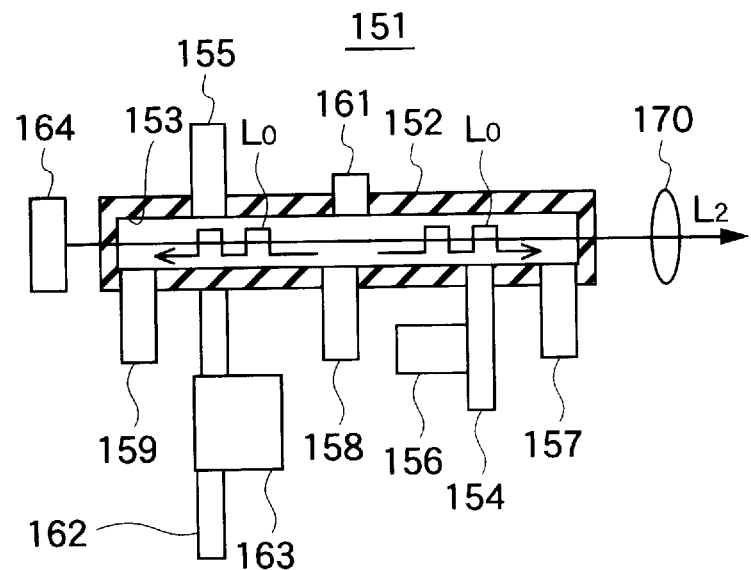
FIG. 17 is a sectional view indicating an another example of the concrete structure of the reference light source as shown in FIG. 15.

It should also be understood that a lens 170 may be positioned on the right side of the housing 152 as shown FIG. 17. In this alternative case, the fluorescent light "$L_0$", which is propagated from the hallow portion 153, is collected by the lens 170, and then is output as the reference light "$L_2$". In other words, in this alternative case, the reference light source 151 may function as an axial excitation type lamp.

Referring again to FIG. 16, a prism 166 is positioned on the right side of the partial reflection mirror 165. The prism 166 spectrally analyzes the reference beam "$L_2$" output from the partial reflection mirror 165 in low resolution. The arranging angle of this prism 166 is set in such a manner that a desirable wavelength contained in the reference beam "$L_2$" is projected from this prism 166 along a preselected direction. A slit plate 167 is arranged on the lower side of the prism 166. A slit 168 is formed in this slit plate 167, and this slit 168 may cause a portion (containing desirable wavelength component) of the reference beam "$L_2$", which has passed through the prism 166, to pass therethrough. As a consequence, both the prism 166 and the slit plate 167 can delete extra wavelength components from the reference beam "$L_2$" while the central wavelength of the laser beam "$L_1$" is measured. Also, the prism and the slit plate may be replaced by a band-pass filter. The reference beam "$L_2$", which has passed the slit 168, is entered into the wavelength 20.

Referring again to FIG. 15, the controller 21 controls the high voltage power supply 160 so as to adjust voltage values applied to the respective electrodes 157, 158, and 159. Also, the controller 21 controls a supply amount of a gaseous medium based upon the measurement value of the pressure meter 156, so that the pressure of the hallow portion 153 can be maintained at a sufficiently low value.

As previously described in detail, according to the 13th embodiment, the laser apparatus 150 is equipped with the reference light source 151 which generates the reference beam "$L_2$" from the fluorescent light "$L_0$". Since both the gas pressure of the gaseous medium and the temperature thereof used to generate the fluorescent light "$L_0$" are kept at the sufficiently low values, both the pressure spread and the Doppler shifts can be sufficiently reduced. As a consequence, the reference beam "$L_2$" having the very narrow line width maybe output. As a consequence, according to the 13th embodiment, even in such a case that the central wavelength of the laser beam "$L_1$" is drifted and is not made stable, the laser beams "$L_1$" can be output while maintaining the central wavelength of the laser beams "$L_1$" at the target wavelength in higher precision than that of the first embodiment.

It should also be noted that the respective embodiments may be applied to vacuum ultraviolet laser beams other than the above-explained molecular fluorine laser beams, for example, ArF (argon fluoride) laser beams. In this alternative case, similar effects to those of the first to 13th embodiments may be achieved.

What is claimed is:

1. A laser apparatus comprising:
    a laser oscillator for generating a vacuum ultraviolet laser beam having a narrowed bandwidth in a vacuum ultraviolet band and a reference beam having a spectral distribution in the vacuum ultraviolet band to output both the vacuum ultraviolet laser beam and the reference beam;
    a wavelength meter for measuring a central wavelength of said vacuum ultraviolet laser beam by using at least one emission light contained in said reference beam as a reference; and
    control means for controlling said laser oscillator on the basis of the central wavelength of the vacuum ultraviolet laser beam measured by said wavelength meter to adjust the central wavelength of the vacuum ultraviolet laser beam to a target wavelength.

2. A laser apparatus according to claim 1, wherein:
    said laser oscillator generates a laser beam having a bandwidth which is not narrowed, as the reference beam.

3. A laser apparatus according to claim 2, wherein said laser oscillator includes:
    a laser chamber for generating vacuum ultraviolet light;
    a first resonant unit, sandwiching said laser chamber, for resonating a portion of the vacuum ultraviolet light, amplifying the resonated vacuum ultraviolet light and narrowing a bandwidth of the vacuum ultraviolet light so as to generate said vacuum ultraviolet laser beam having the narrowed bandwidth; and
    a second resonant unit, sandwiching said laser chamber and having an oscillation direction identical to that of said first resonant unit, for resonating another portion of said vacuum ultraviolet light and amplifying the resonated another portion of said vacuum ultraviolet light so as to generate said laser beam having the bandwidth which is not narrowed.

4. A laser apparatus according to claim 2, wherein said laser oscillator includes:
    a laser chamber for generating vacuum ultraviolet light;
    a first resonant unit, sandwiching said laser chamber, for resonating a portion of the vacuum ultraviolet light, amplifying the resonated vacuum ultraviolet light and narrowing a bandwidth of the amplified vacuum ultraviolet light so as to generate said vacuum ultraviolet laser beam having the narrowed bandwidth; and
    a second resonant unit, sandwiching said laser chamber and having an oscillation direction different from that of said first resonant unit, for resonating another portion of the vacuum ultraviolet light and amplifying the resonated another portion of the vacuum ultraviolet light so as to generate said laser beam having the bandwidth which is not narrowed.

5. A laser apparatus according to claim 2, wherein said laser oscillator includes:
    a laser chamber for generating vacuum ultraviolet light;
    a first resonant unit, sandwiching said laser chamber, for resonating a portion of the vacuum ultraviolet light, amplifying the resonated vacuum ultraviolet light and narrowing a bandwidth of the amplified vacuum ultraviolet light so as to generate the vacuum ultraviolet laser beam having the narrowed bandwidth;
    at least one partial reflection mirror, arranged between both ends of said first resonant unit at a Brewster's angle with respect to an oscillation direction of said first resonant unit, for reflecting a portion of S-polarization light contained in the vacuum ultraviolet light into a direction different from the oscillation angle of said first resonant unit; and
    a second resonant unit, sandwiching said laser chamber, for resonating the S-polarization light reflected from said at least one partial reflection mirror and amplifying the resonated S-polarization light so as to generate the laser beam having the bandwidth which is not narrowed.

6. A laser apparatus according to claim 1, wherein:
    said laser oscillator generates vacuum ultraviolet light as the reference beam.

7. A laser apparatus according to claim 6, wherein said laser oscillator includes:
    a laser chamber for generating vacuum ultraviolet light; and
    a resonant unit, sandwiching said laser chamber, for resonating a portion of the vacuum ultraviolet light, amplifying the resonated vacuum ultraviolet light and narrowing a bandwidth of the amplified vacuum ultraviolet light so as to generate the vacuum ultraviolet laser beam having the narrowed bandwidth, wherein:
    another portion of the vacuum ultraviolet light which is not resonated in said resonant unit is utilized as the reference beam.

8. A laser apparatus according to claim 6, wherein said laser oscillator includes:
    a laser chamber for generating vacuum ultraviolet light; and
    a resonant unit, sandwiching said laser chamber, for resonating a portion of the vacuum ultraviolet light, amplifying the resonated vacuum ultraviolet light and narrowing a bandwidth of the amplified vacuum ultraviolet light so as to generate the vacuum ultraviolet laser beam having the narrowed bandwidth, wherein:
    a window is formed in one side wall of said laser chamber such that another portion of the vacuum ultraviolet light which has passed through said window is utilized as the reference beam.

9. A laser apparatus according to claim 6, wherein said laser oscillator includes:

a laser chamber for generating vacuum ultraviolet light;

a resonant unit, sandwiching said laser chamber, for resonating a portion of said vacuum ultraviolet light, amplifying the resonated vacuum ultraviolet light and narrowing a bandwidth of the amplified vacuum ultraviolet light so as to generate the vacuum ultraviolet laser beam having the narrowed bandwidth; and at least one partial reflection mirror, arranged between both ends of said resonant unit at a Brewster's angle with respect to an oscillation direction of said resonant unit, for reflecting a portion of S-polarization light contained in the vacuum ultraviolet light into a direction different from the oscillation direction of said resonant unit, wherein:

the S-polarization light reflected from said at least one partial reflection mirror is utilized as the reference beam.

10. A laser apparatus according to claim 1, wherein:

said laser oscillator generates a molecular fluorine laser beam having a narrowed bandwidth.

11. A laser apparatus comprising:

a laser oscillator for generating a vacuum ultraviolet laser beam having a narrowed bandwidth in a vacuum ultraviolet band to output the vacuum ultraviolet laser beam;

a reference light source for generating a reference beam having a spectral distribution in the vacuum ultraviolet band to output the reference beam, said reference light source including a housing formed with a hallow portion for generating vacuum ultraviolet light, a resonant unit, sandwiching said housing, for resonating the vacuum ultraviolet light and amplifying the resonated vacuum ultraviolet light so as to generate a laser beam having a bandwidth which is not narrowed, as the reference beam, supplying means for supplying a medium from which the vacuum ultraviolet light is generated into said hallow portion, an exhausting unit for exhausting said medium from said hallow portion, and a pressure meter for measuring pressure in said hallow portion;

a wavelength meter for measuring a central wavelength of the vacuum ultraviolet laser beam by using at least one emission light contained in the reference beam as a reference; and control means for controlling said supplying means on the basis of the pressure in said hallow portion measured by said pressure meter to adjust the pressure of said hallow portion to a predetermined value and controlling said laser oscillator on the basis of the central wavelength of the vacuum ultraviolet laser beam measured by said wavelength meter to adjust the central wavelength of the vacuum ultraviolet laser beam to a target wavelength.

12. A laser apparatus comprising:

a laser oscillator for generating a vacuum ultraviolet laser beam having a narrowed bandwidth in a vacuum ultraviolet band to output the vacuum ultraviolet laser beam;

a reference light source for generating a reference beam having a spectral distribution in the vacuum ultraviolet band to output the reference beam, said reference light source including a housing formed with a hallow portion for generating vacuum ultraviolet light, a resonant unit, sandwiching said housing, for resonating the vacuum ultraviolet light and amplifying the resonated vacuum ultraviolet light so as to generate a laser beam having a bandwidth which is not narrowed, as the reference beam, supplying means for supplying a medium from which the vacuum ultraviolet light is generated into said hallow portion, an exhausting unit for exhausting said medium from said hallow portion, a temperature meter for measuring a temperature in said hallow portion, and cooling means for cooling said housing;

a wavelength meter for measuring a central wavelength of the vacuum ultraviolet laser beam by using at least one emission light contained in the reference beam as a reference; and control means for controlling said cooling means on the basis of the temperature measured by said temperature meter to adjust the temperature of said housing to a predetermined value and controlling said laser oscillator on the basis of the central wavelength of the vacuum ultraviolet laser beam measured by said wavelength meter to adjust the central wavelength of the vacuum ultraviolet laser beam to a target wavelength.

13. A laser apparatus according to claim 11 wherein:

said laser oscillator generates a molecular fluorine laser beam having a narrowed bandwidth.

14. A laser apparatus comprising:

a laser oscillator for generating a vacuum ultraviolet laser beam having a narrowed bandwidth in a vacuum ultraviolet band to output the vacuum ultraviolet laser beam;

a reference light source for generating a reference beam having a spectral distribution in the vacuum ultraviolet band to output the reference beam, said reference light source including a housing formed with a hallow portion for generating vacuum ultraviolet light as the reference beam, supplying means for supplying a medium from which the vacuum ultraviolet light is generated into said hallow portion, an exhausting unit for exhausting said medium from said hallow portion, and a pressure meter for measuring pressure in said hallow portion;

a wavelength meter for measuring a central wavelength of the vacuum ultraviolet laser beam by using at least one emission light contained in the reference beam as a reference; and control means for controlling said supplying means on the basis of the pressure in said hallow portion measured by said pressure meter to adjust the pressure of said hallow portion to a predetermined value and controlling said laser oscillator on the basis of the central wavelength of the vacuum ultraviolet laser beam measured by said wavelength meter to adjust the central wavelength of the vacuum ultraviolet laser beam to a target wavelength.

15. A laser apparatus comprising:

a laser oscillator for generating a vacuum ultraviolet laser beam having a narrowed bandwidth in a vacuum ultraviolet band to output the vacuum ultraviolet laser beam;

a reference light source for generating a reference beam having a spectral distribution in the vacuum ultraviolet band to output the reference beam, said reference light source including a housing formed with a hallow portion for generating vacuum ultraviolet light as the reference beam, supplying means for supplying a medium from which the vacuum ultraviolet light is generated into said hallow portion, an exhausting unit for exhausting said medium from said hallow portion, a temperature meter for measuring temperature in said hallow portion, and cooling means for cooling said housing;

a wavelength meter for measuring a central wavelength of the vacuum ultraviolet laser beam by using at least one emission light contained in the reference beam as a reference; and control means for controlling said cooling means on the basis of the temperature measured by said temperature meter to adjust the temperature of said housing to a predetermined value and controlling said laser oscillator on the basis of the central wavelength of the vacuum ultraviolet laser beam measured by said wavelength meter to adjust the central wavelength of the vacuum ultraviolet laser beam to a target wavelength.

16. A laser apparatus according to claim 12, wherein:

said laser oscillator generates a molecular fluorine laser beam having a narrowed bandwidth.

17. A laser apparatus according to claim 14 wherein said laser oscillator generates a molecular fluorine laser beam having a narrowed bandwidth.

18. A laser apparatus according to claim 15 wherein said laser oscillator generates a molecular fluorine laser beam having a narrowed bandwidth.

* * * * *